(12) United States Patent
Montenguise et al.

(10) Patent No.: US 12,256,658 B2
(45) Date of Patent: Mar. 25, 2025

(54) CONTROLLING SEED PLACEMENT BASED ON PRIOR MATERIAL PLACEMENT

(71) Applicant: Deere & Company, Moline, IL (US)

(72) Inventors: Justin L. Montenguise, Bettendorf, IA (US); Cary S. Hubner, Geneseo, IL (US); Grant J. Wonderlich, Milan, IL (US)

(73) Assignee: Deere & Company, Moline, IL (US)

(*) Notice: Subject to any disclaimer, the term of this patent is extended or adjusted under 35 U.S.C. 154(b) by 314 days.

(21) Appl. No.: 17/677,521

(22) Filed: Feb. 22, 2022

(65) Prior Publication Data

US 2023/0263086 A1    Aug. 24, 2023

(51) Int. Cl.
*A01B 79/02* (2006.01)
*A01C 7/06* (2006.01)
*A01C 7/10* (2006.01)

(52) U.S. Cl.
CPC ............... *A01B 79/02* (2013.01); *A01C 7/06* (2013.01); *A01C 7/102* (2013.01)

(58) Field of Classification Search
CPC ....... A01B 79/00; A01B 79/005; A01B 79/02; A01C 7/06; A01C 7/10–107; A01C 7/18; A01C 17/006; A01C 17/008; A01C 21/005; A01C 23/007; A01C 23/026; A01C 5/08
See application file for complete search history.

(56) References Cited

U.S. PATENT DOCUMENTS

| | | | |
|---|---|---|---|
| 8,849,523 B1* | 9/2014 | Chan ................ | A01G 25/167 701/50 |
| 11,445,658 B2 | 9/2022 | Garner et al. | |
| 2013/0124055 A1* | 5/2013 | Baurer ................. | H04L 5/0053 701/461 |
| 2015/0134210 A1 | 5/2015 | Steffen et al. | |
| 2018/0259979 A1* | 9/2018 | Schoeny ............... | A01C 7/126 |
| 2019/0350127 A1* | 11/2019 | Sauder ................. | A01C 7/105 |
| 2021/0059107 A1 | 3/2021 | Garner et al. | |
| 2024/0016079 A1* | 1/2024 | Dreyer .................. | A01C 7/107 |

OTHER PUBLICATIONS

Extended European Search Report and Written Opinion issued in European Patent Application No. 23156817.1, dated Jul. 4, 2023, in 8 pages.

* cited by examiner

*Primary Examiner* — Spencer D Patton
(74) *Attorney, Agent, or Firm* — Christopher J. Volkmann; Kelly, Holt & Christenson, PLLC

(57) ABSTRACT

An indication of previously-applied material is obtained. A planting machine is controlled to plant seeds based on the indication of the previously-applied material.

19 Claims, 15 Drawing Sheets

CONTROLLING SEED PLACEMENT BASED ON PRIOR MATERIAL PLACEMENT

FIELD OF THE DESCRIPTION

The present description generally relates to planting equipment. More specifically, but not by limitation, the present description relates to a processing and control system for an agricultural planting machine that is configured to sense and track seed movement to control seed release from a seeding system to a target location based on the location of material previously applied to the field.

BACKGROUND

There are a wide variety of different types of agricultural seeding or planting machines. They can include row crop planters, or the like. These machines place seeds at a desired depth within a plurality of parallel seed trenches that are formed in the soil. As one example, a row unit is often mounted to a planter with a plurality other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set the depth of penetration of the disk openers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. In one example, the seed metering system uses a rotating mechanism (which is normally a disc or a concave or bowl-shaped mechanism) that has seed receiving apertures, that receive the seeds from a seed pool and move the seeds from the seed pool to the seed delivery system which delivers the seeds to the ground (or to a location below the surface of the ground, such as in a trench). The seeds can be biased into the seed apertures in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where the seeds exit into the ground or trench.

Row units can also be used to apply material to the field (e.g., fertilizer, herbicide, insecticide, or pesticide etc.) over which they are traveling. In some scenarios, each row unit has a valve that is coupled between a source of material to be applied, and an application assembly. As the valve is actuated, the material passes through the valve, from the source to the application assembly, and is applied to the field. In other scenarios, each row unit has a commodity tank and a commodity delivery system that delivers a commodity (such as fertilizer, herbicide, insecticide, pesticide, etc.) to the soil.

Many current systems apply the material in a substantially continuous way. For instance, where the application machine is applying a liquid fertilizer, the machine actuates the valve to apply a substantially continuous strip of the liquid fertilizer. The same is true of machines that apply other liquid substances, as examples.

The discussion above is merely provided for general background information and is not intended to be used as an aid in determining the scope of the claimed subject matter.

SUMMARY

An indication of previously-applied material is obtained. A planting machine is controlled to plant seeds based on the indication of the previously-applied material.

Example 1 is a computer implemented method of controlling a planter, comprising:
  identifying a material characteristic indicative of previously applied material applied to a field;
  controlling the planter to plant seed based on the material characteristic.

Example 2 is the computer implemented method of any or all previous examples wherein identifying a material characteristic comprises:
  identifying a material location indicative of a location where the previously applied material was applied to the field.

Example 3 is the computer implemented method of any or all previous examples wherein the planter is configured to move through a field in a direction of travel and wherein controlling the planter comprises:
  controlling the planter to eject seeds from a seed ejection endpoint at seed locations in a furrow opened by the planter based on the material location.

Example 4 is the computer implemented method of any or all previous examples and further comprising:
  applying the material to the field with a material application system coupled to the planter to apply the material ahead of the seed ejection endpoint in the direction of travel.

Example 5 is the computer implemented method of any or all previous examples wherein identifying the location of the material comprises:
  identifying, during operation of the planter, the location of the previously applied material relative to the seed ejection endpoint.

Example 6 is the computer implemented method of any or all previous examples wherein controlling the planter to eject seeds comprises:
  controlling the planter to eject a seed based on the location of the previously applied material relative to the seed ejection endpoint.

Example 7 is the computer implemented method of any or all previous examples wherein identifying the location of the material comprises:
  identifying a geographic location of the previously applied material.

Example 8 is the computer implemented method of any or all previous examples wherein controlling the planter to eject seeds comprises:
  identifying a geographic location of the planter; and
  controlling the planter to eject a seed based on the geographic location of the previously applied material and the geographic location of the planter.

Example 9 is the computer implemented method of any or all previous examples wherein controlling the planter comprises:
controlling the planter, based on the location of the material, to eject the seed from the seed ejection endpoint at a point that conforms to a predefined spatial relation to the location of the material.

Example 10 is the computer implemented method of any or all previous examples wherein identifying a material location comprises:
identifying a timing of material placement by the material application system to a location in the field.

Example 11 is the computer implemented method of any or all previous examples wherein controlling the planter comprises:
controlling the planter, based on the timing of material placement, to eject the seed from the seed ejection endpoint at a time so the seed is ejected at a location in a predefined spatial relation to the location of the material in the field.

Example 12 is the computer implemented method of any or all previous examples wherein identifying a material location comprises:
receiving a material map that maps locations in the field where the previously applied material was applied; and
identifying a geographic location of the material based on the material map.

Example 13 is the computer implemented method of any or all previous examples wherein controlling the planter to eject seeds comprises:
controlling the planter to eject seeds from a seed ejection endpoint at seed locations in a furrow opened by the planter based on the geographic location of the material.

Example 14 is an agricultural system, comprising:
an agricultural machine including a seeding system that delivers seed to a field;
a target determination component that identifies a target parameter indicative of previously applied material applied to a field; and
a seed ejection system generating a control signal to control the seeding system to plant the seed based on the target parameter.

Example 15 is the agricultural system of any or all previous examples and further comprising:
a seed tracking system configured to track a position of seeds in the seeding system and generate a seed position signal, the seed ejection system being configured to generate the control signal based on the seed tracking signal.

Example 16 is the agricultural system of any or all previous examples wherein the agricultural machine is configured to move through the field in a direction of travel and wherein the target determination component is configured to control the seeding system to eject seeds from a seed ejection endpoint at seed locations in a furrow opened by the agricultural machine based on the target parameter.

Example 17 is the agricultural system of any or all previous examples wherein the agricultural machine further comprises:
a material application control system; and
a material application system controlled by the material application control system to apply the material to locations in the field ahead of the seed ejection endpoint in the direction of travel.

Example 18 is the agricultural system of any or all previous examples wherein the target determination component is configured to identify, during operation of the seeding system, a location of the previously applied material relative to the seed ejection endpoint, the seed ejection system being configured to control the seeding system to eject a seed based on the locations of the previously applied material relative to the seed ejection endpoint.

Example 19 is a computer system for controlling a planter that is configured to move through a field in a direction of travel, the computer system comprising:
at least one processor; and
memory storing computer executable instructions which, when executed by the at least one processor, cause the at least one processor to perform steps, comprising:
identifying a material location characteristic indicative of a location of previously applied material applied to a field; and
controlling the planter to eject seeds from a seed ejection endpoint at seed locations in a furrow opened by the planter based on the material location characteristic.

Example 20 is the computer system of any or all previous examples and further comprising:
a material application system; and
a material application control system configured to control the material application system to apply the material to the field ahead of the seed ejection endpoint in the direction of travel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many current systems apply material to a field in a relatively continuous way. This can result in wasted material. For instance, some material that is applied at certain locations between seeds or plants in a field may be unnecessary. Similarly, it may be desirable to apply some material only at locations other than seeds. Thus, continuous application can result in lower productivity and lower efficiency. This problem can be exacerbated in instances where the material is applied at a relatively high rate, such as in the case of high rate fertilizer application.

The present description thus proceeds with respect to a system that controllably applies fertilizer (or other material) as desired (such as intermittently or otherwise), identifies an indication of where the fertilizer or other material is applied (such as the specific location or timing of fertilizer application), and controllably dispenses a seed based upon the indication of where the fertilizer or other material was applied. It will be appreciated that the present discussion will proceed with respect to placing or applying fertilizer and then seeding based on the fertilizer location. However, the same discussion can be made with respect to placing or applying other material (such as herbicide, pesticide, etc.), and fertilizer is just one example of material that can be applied.

Figure 1:
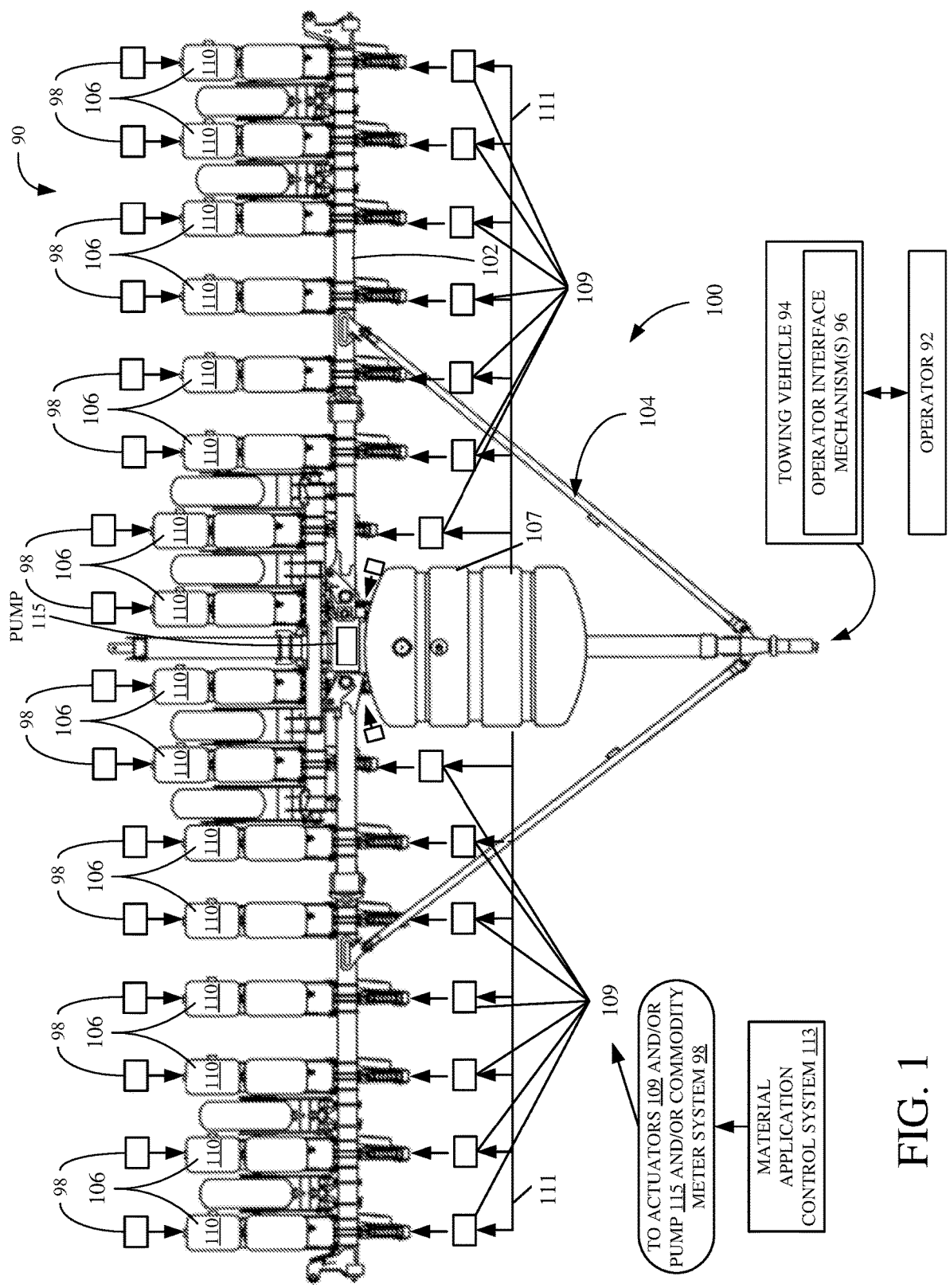
FIG. 1 shows one example of a top view of an agricultural machine.

FIG. 1 is a partial pictorial, partial schematic top view of one example of an architecture 90 that includes agricultural planting machine 100, towing vehicle 94, that is operated by operator 92, and material application control system 113, which can be on one or more individual parts of machine 100 (such as on each row unit, or set of row units), centrally located on machine 100, distributed about the architecture 90, or on towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 and pumped through a supply line 111 so the material can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so the material can be dispensed on the field. In such an example, material application control system 113 controls the pumps 109. In another example, actuators 109 are valves and one or more pumps 115 pump the material from tank 107 to valves 109 through supply line 111. In such an example, material application control system 113 controls valves 109 by generating valve or actuator control signals. The control signal for each valve or actuator can, in one example, be a pulse width modulated control signal. The flow rate through the corresponding valve 109 can be based on the duty cycle of the control signal (which controls the amount of time the valve is open and closed). The flow rate can be based on multiple duty cycles of multiple valves or based on other criteria. Further, the material can be applied in varying rates. For example, fertilizer may be applied at one rate when it is being applied at a location where it will be spaced from a seed location and at a second, higher, rate when it is being applied at a location closer to the seed location. These are examples only.

In addition, each row unit 106 can have a commodity tank 110 that stores material to be applied. A commodity delivery system 98 (as is discussed in greater detail below) can have a motor that drives a commodity meter that dispenses an amount of the material. The motor can be controlled by material application control system 113 to dispense the material at desired locations or in another desired way.

Figure 2:
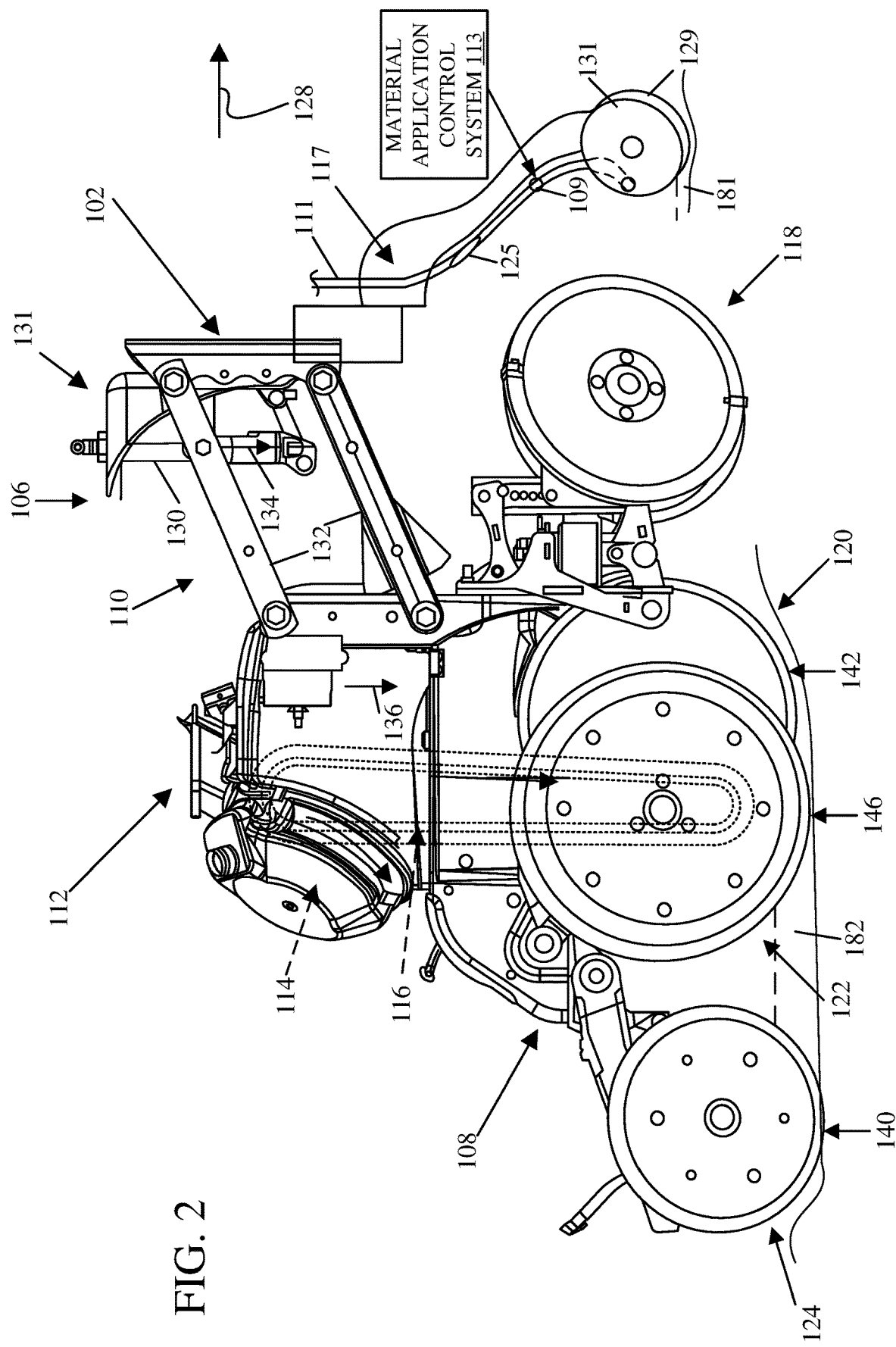
FIG. 2 shows one example of a side view of a row unit of the agricultural machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that linkage 110 can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench 182 generated by furrow opener 120 on the row unit 106. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, ahead of furrow opener 120, a set of gauge wheels 122, and a set of closing wheels 124. Row unit 106 can also include an additional hopper that can be used to provide additional material, such as a fertilizer or another chemical.

Row unit 106 also has a fertilizer furrow opener 129 and a depth setting gauge wheel 131. A fertilizer conduit or supply line 125 carries fertilizer (or other material) to a valve 109. Valve 109 is actuated by material application control system 113. System 113 can control the valve 109 to dispense the material. Opener 129 can open a furrow 181 that is offset from furrow 182 opened by furrow opener 120 in a direction transverse to the direction of travel 128 to apply fertilizer at a location to the side of seeds. Opener 129 can also open a furrow 181 aligned with the furrow 182 opened by opener 120 so fertilizer (or other material) can be placed in furrow 182 prior to placing the seeds so the fertilizer (or other material) is below seeds or between seeds in the furrow 182.

In operation, as row unit 106 moves in the direction generally indicated by arrow 128, opener 129 opens a furrow 181 at a depth by gauge wheel 131. Material application control system 113 generates a control signal to actuate valve 109 to apply material (such as fertilizer) to the furrow at desired locations, or intervals in furrow 181. Row cleaner 118 generally cleans the row ahead of the opener 120 to remove plant debris from the previous growing season and the opener 120 opens a furrow 182 in the soil. Gauge wheels 122 control a depth of the furrow 182, and seed is metered by seed metering system 114 and delivered to the furrow by seed delivery system 116. The position of each seed (and/or when the seed is placed in the furrow) is controlled based on the position of fertilizer, or the timing of application of fertilizer, as is described below. Closing wheels 124 close the furrow 182 over the seed. A downforce generator 131 can also be provided to controllably exert downforce to keep the row unit 106 in desired engagement with the soil.

Figure 3:
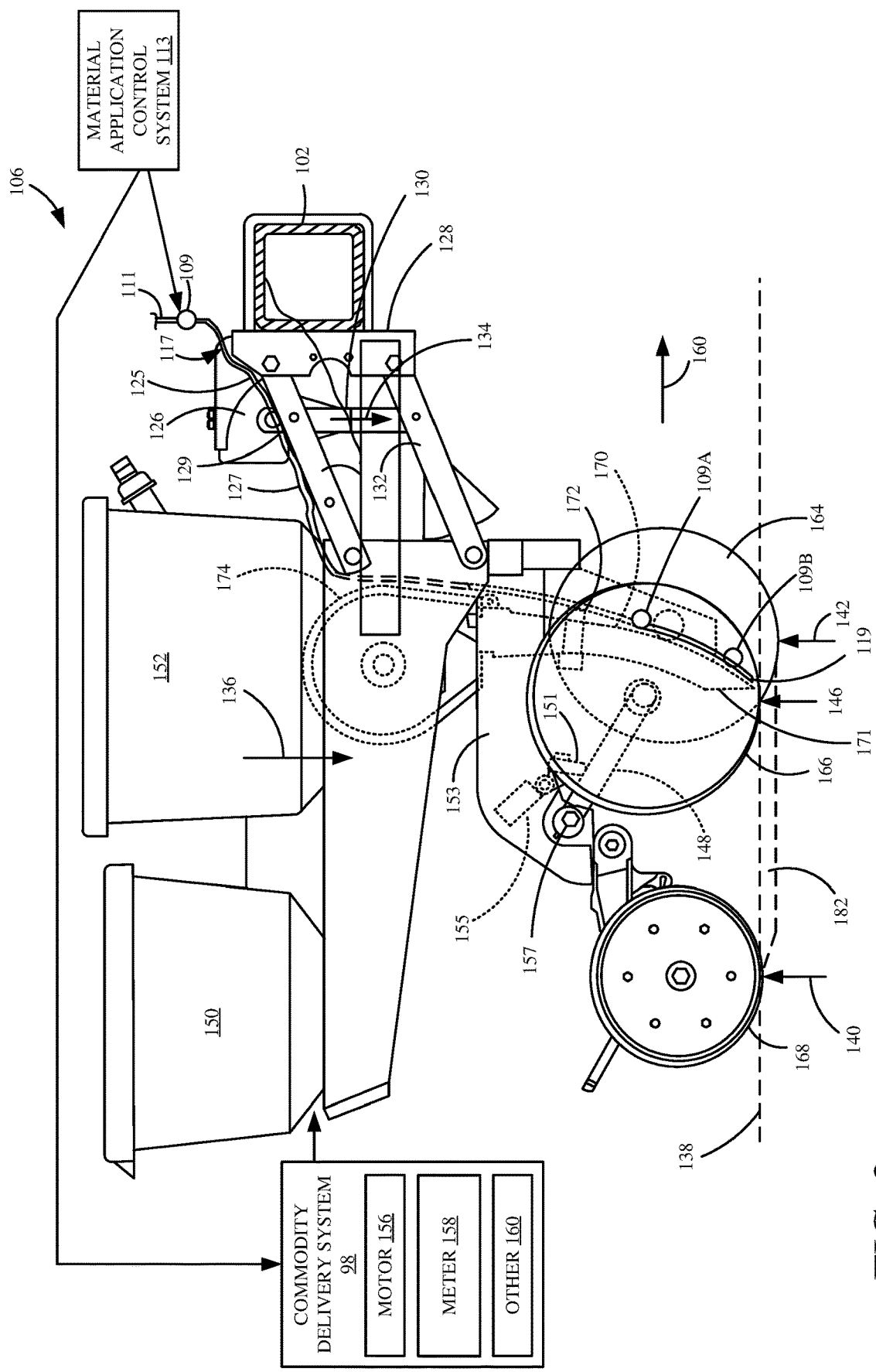
FIG. 3 shows an example of a side view of a row unit of the agricultural machine shown in FIG. 1.

FIG. 3 is a side view of another example of a row unit 106, with actuator 109, and system 113 shown as well. Actuator 109 is shown in three possible locations labeled as 109, 109A, and 109B. Row unit 106 illustratively includes a chemical tank (also referred to herein as a commodity tank) 150, a seed storage tank 152, and commodity delivery system 98 (which, itself, can include a motor 156, a commodity meter 158 and it can include other items 160). Row unit 106 also illustratively includes one or more disc openers 164, a set of gauge wheels 166, and a set of closing wheels 168. Seeds from tank 152 are fed into a seed meter 174 (e.g., by gravity or from a centralized commodity distribution system that uses pneumatic commodity distribution to each row unit). The seed meter 174 controls the rate at which seeds are dropped into a seed tube 170 or other seed delivery system, such as a brush belt or flighted belt from seed storage tank 152. The seeds can be sensed by a seed sensor 172.

In the example shown in FIG. 3, liquid material is passed, e.g., pumped or otherwise forced, through supply line 111 to an inlet end of actuator 109. Actuator 109 is controlled by control system 113 to allow the liquid to pass from the inlet end of actuator 109 to an outlet end.

As liquid passes through actuator 109, the liquid travels through an application assembly 117 from a proximal end (which is attached to an outlet end of actuator 109) to a distal tip (or application tip) 119, where the liquid is discharged into a trench 182, or proximate a trench or furrow 182, opened by disc opener 164.

Material application control system 113 can generate control signals to control motor 156 to drive commodity meter 158. Meter 158, when driven by motor 156, meters out a desired amount of commodity from tank 150.

Some parts of row unit 106 shown in FIGS. 2 and 3 will now be discussed in more detail. First, it will be noted that there are different types of seed meters 114, 174, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system can be a gravity drop system (such as seed tube 170 shown in FIG. 3) in which seeds are dropped through the seed tube 170 and fall (via gravitational force) through the seed tube and out the outlet end 171 into the seed trench 182. Other types of seed delivery systems may be or may include assistive systems (e.g., system 116 shown in FIG. 2), in that the assistive systems do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 5 and 6.

A downforce actuator or generator 131, 126 is mounted on a coupling assembly 110, 128 that couples row unit 106 to toolbar 102. Actuator 131, 126 can be a hydraulic actuator, a pneumatic actuator, a spring-based mechanical actuator or a wide variety of other actuators. In the example shown in FIGS. 2 and 3, a rod 130 is coupled to a parallel linkage 132 and is used to exert an additional downforce (in the direction indicated by arrow 134) on row unit 106. The total downforce (which includes the force indicated by arrow 134 exerted by actuator 136, 126, plus the force due to gravity acting on row unit 106, and indicated by arrow 136) is offset by upwardly directed forces acting on closing wheels 124, 168 (from ground and indicated by arrow 140) and disc opener 120, 164 (again from ground and indicated by arrow 142). In FIG. 3 the offsetting force may also include upwardly directed forces on row cleaner 118. The remaining force (the sum of the force vectors indicated by arrows 134 and 136, minus the force indicated by arrows 140 and 142—and in the example shown in FIG. 2, the force on cleaner 118) and the force on any other ground engaging component on the row unit, is the differential force indicated by arrow 146. The differential force may also be referred to herein as the downforce margin. The force indicated by arrow 146 acts on the gauge wheels 122, 166. This load can be sensed by a gauge wheel load sensor, which may be located anywhere on row unit 106 where it can sense that load. The gauge wheel load sensor can also be placed where it may not sense the load directly, but a characteristic indicative of that load. For example, the load sensor can be disposed near a set of gauge wheel control arms (or gauge wheel arm), such as arms 148 in FIG. 2 that movably mount gauge wheels 166 to shank 152 and control an offset between gauge wheels 166 and the discs in double disc opener 164, to control planting depth.

Some items regarding planting depth and seed delivery are now shown and described with respect to FIG. 3 for the sake of example, but they could also be shown and described in a similar way with respect to FIG. 2. Arms (or gauge wheel arms) 148 illustratively abut against a mechanical stop (or arm contact member—or wedge) 151. The position of mechanical stop 151 relative to shank 153 can be set by a planting depth actuator assembly 155. Control arms 148 illustratively pivot around pivot point 157 so that, as planting depth actuator assembly 155 actuates to change the position of mechanical stop 151, the relative position of gauge wheels 166, relative to the double disc opener 164, changes, to change the depth at which seeds are planted.

In operation, row unit 106 travels generally in the direction indicated by arrow 160. The double disc opener 164 opens the furrow 182 in the soil 138, and the depth of the furrow 182 is set by planting depth actuator assembly 155, which, itself, controls the offset between the lowest parts of gauge wheels 166 and disc opener 164. Seeds are dropped through seed tube 170, into the furrow 182 and closing wheels 168 close the furrow 182, e.g., push soil back into the furrow 182.

As the seeds are dropped through seed tube 170, they can be sensed by seed sensor 172. Some examples of seed sensor 172 may include an optical or reflective sensor, which includes a radiation transmitter component and a receiver component. The transmitter component emits electro-magnetic radiation and the receiver component then detects the radiation and generates a signal indicative of the presence or absence of a seed adjacent the sensors. In another example, row unit 106 may be provided with a seed firmer that is positioned to travel through the furrow 182, after seeds are placed in furrow 182, and before the furrow 182 is closed to firm the seeds in place. A seed sensor can be placed on the seed firmer and generate a sensor signal indicative of a seed. Some examples of other seed sensors are described in greater detail below.

In order to determine where a seed is to be placed, in one example, a target determination component described below with respect to FIG. 7 first determines where the fertilizer or other material has been placed. The location of the fertilizer or other material may be determined by material application control system 113. Material application control system 113 illustratively is programmed with, or detects a distance, e.g., a longitudinal distance, that the distal tip 119 is from the exit end 171 of seed tube 170. System 113 also illustratively senses, or is provided (e.g., by another component, such as a GPS unit or a tractor, etc.), the ground speed of row unit 106. As the row units 106 on an implement being towed by a prime mover (e.g., a tractor) may move faster or slower than the tractor during turns, particularly as the width of the implement increases, the material application control system 113 may sense or be provided the ground speed of each row unit 106 of the implement. By way of example, the material application control system 113 may sense or be provided information when the implement is turning right indicating that the rightmost row unit 106 is travelling slower, i.e., has a lower ground speed, than the leftmost row unit 106. Further, the material application control system 113 detects, is provided, or is programmed with, system data indicating the responsiveness of actuator 109 and/or motor 156 and commodity meter 158, under certain conditions (such as under certain temperature conditions, certain humidity conditions, certain elevations, when spraying a certain type of fluid, etc.) and system 113 also detects, is provided, or programmed with one or more properties of the material being applied through actuator 109 and commodity delivery system 98 (as this may affect the speed at which actuator 109 and/or system 154 responds, the time it takes for the material to travel through application assembly 117 to the distal tip 119 or delivered by system 98 and be applied to furrow 182, etc.). Further, material application control system 113 illustratively detects (or is provided with a sensor signal indicative of) the forward speed of row unit 106 in the direction generally indicated by arrow 160.

With this type of information, once system 113 receives a signal indicating that fertilizer or other material is dispensed, system 113 It then determines where tip 119 (or an outlet end of commodity delivery system 98) was when the valve 109 was actuated or commodity motor 156 was actuated to determine the location where the material was applied in the furrow. By way of example, it may be that some material is to be applied in discontinuous strips in the furrow, of a given (the strips having a pre-set, default, or selected) length. In that case, system 113 times the actuation of actuator 109 so that the applied material will be applied as strips of the given length. Further, actuator 109 can be actuated to dispense material at a varying rate. System 113 can control actuator 109 to dispense more material at a first set of locations and less at other locations spaced from the first set of locations or according to other patterns. The seeds can then be placed at desired locations relative to such patterns of material placement.

It will be noted that a wide variety of different configurations are contemplated herein. For instance, in one example, FIG. 3 shows that actuator 109 may be placed closer to the distal tip 119 (such as indicated by actuator locations 109A and 109B). In this way, there is less uncertainty as to how long it will take the material to travel from the actuator 109A and 109B to the distal tip 119. In yet another example, the valve or actuator 109 is disposed at a different location. All of these and other configurations are contemplated herein.

Figure 4:
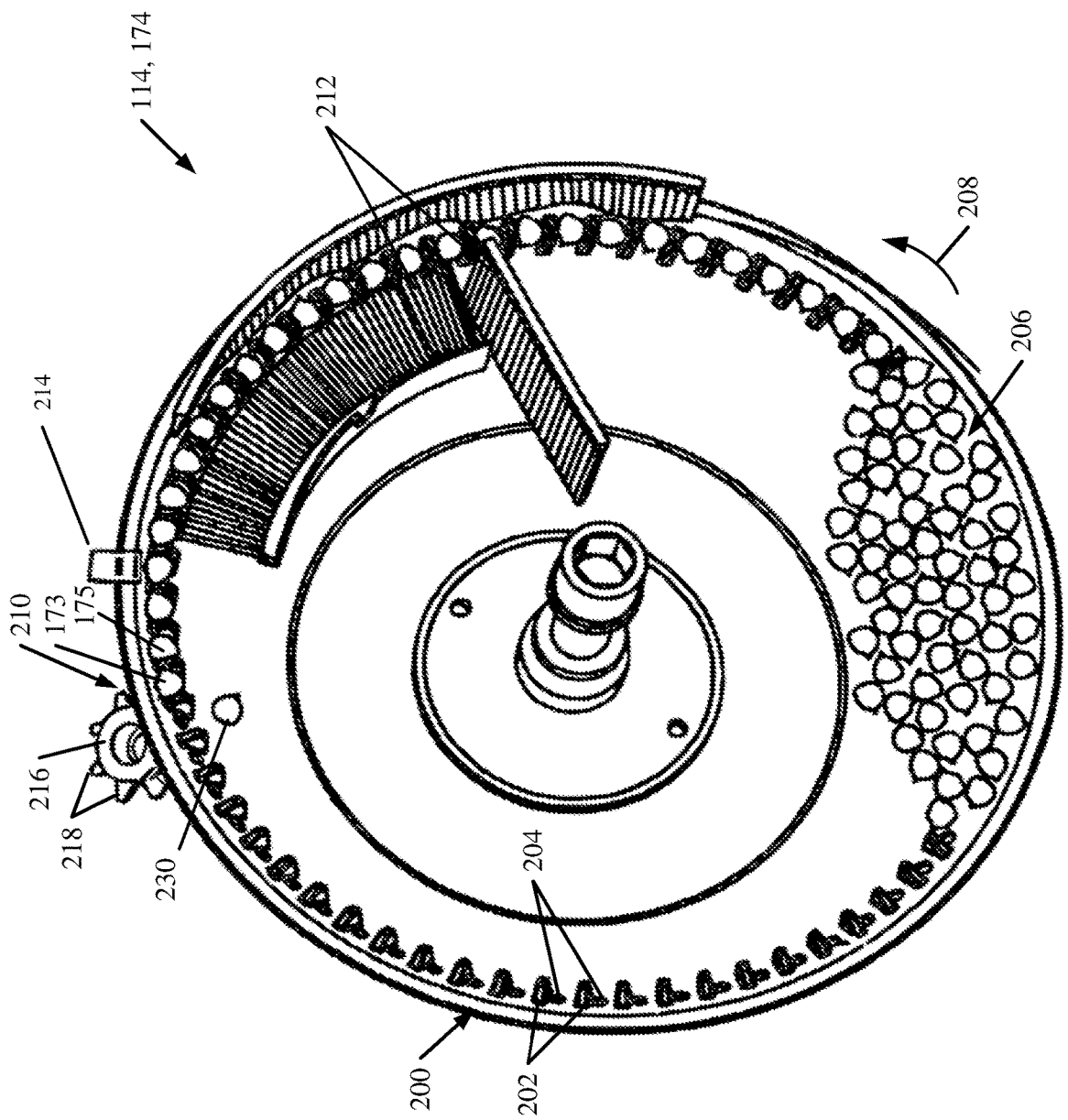
FIG. 4 is a perspective view of a portion of a seed metering system.

FIG. 4 shows one example of a rotatable mechanism that can be used as part of the seed metering system 114, 174. The rotatable mechanism includes a rotatable element 200, such as a disc or concave element. Rotatable element 200 has a cover (not shown) and is rotatably mounted relative to the frame of the row unit 106. Rotatable element 200 is driven by a motor and has a plurality of projections or tabs 202 that are closely proximate corresponding apertures 204. A seed pool 206 is disposed generally in a lower portion of an enclosure formed by rotatable element 200 and its corresponding cover. Rotatable element 200 is rotatably driven by a motor (such as an electric motor, a pneumatic motor, a hydraulic motor, etc.) for rotation generally in the direction indicated by arrow 208, about a hub. A pressure differential is introduced into the interior of the metering system so that the pressure differential influences seeds from seed pool 206 to be drawn to apertures 204. For instance, a vacuum can be applied to draw the seeds from seed pool 206 so that they come to rest in apertures 204, where the vacuum holds them in place. Alternatively, a positive pressure can be introduced into the interior of the metering system to create a pressure differential across apertures 204 to perform the same function.

Once a seed comes to rest in (or proximate) an aperture 204, the vacuum or positive pressure differential acts to hold the seed within the aperture 204 such that the seed is carried upwardly generally in the direction indicated by arrow 208, from seed pool 206, to a seed discharge area 210. It may happen that multiple seeds are residing in an individual seed cell. In that case, a set of brushes or other members 212 that are located closely adjacent the rotating seed cells tend to remove the multiple seeds so that only a single seed is carried by each individual cell. Additionally, a sensor 214 is also illustratively mounted adjacent to rotatable element 200.

Once the seeds reach the seed discharge area 210, the vacuum or other pressure differential is illustratively removed, and a positive seed removal wheel or knock-out wheel 216, can act to remove the seed from the seed cell. Wheel 216 illustratively has a set of projections 218 that protrude at least partially into apertures 204 to actively dislodge the seed from those apertures. When the seed is dislodged, it is illustratively moved by the seed delivery system 116 (one example of which is seed tube 170 and two other examples of which are shown below in FIGS. 5 and 6) to the furrow in the ground. FIG. 4 shows seeds 173 and 175 approaching knock-out wheel 216 and seed 230 after being removed from aperture 204 by one of the projections 218 on knock-out wheel 216.

It will be noted that the motor that drives rotation of meter rotatable element 200 or rotatable element 200, itself, can be arranged relative to a seed meter sensor that generates a sensor signal indicative of the angular position of the motor, or the rotatable element 200, or another item from which the angular position of rotatable element 200, can be derived. As described below, the angular position of rotatable element 200, along with the signal from seed sensor 214 and the speed of rotation of meter 114, 174, can be used to determine the position of the seed as it moves through the seeding system and into the ground. This can be used to control the dispensing of seeds at precise field locations.

In one example, the seed meter sensor comprises a rotary or angle encoder that senses an angular position of a portion of seed metering system 114, 174, or of the motor driving seed metering system 114, 174. For instance, a rotary encoder can be mounted inside the motor driving the meter shaft, or can be external to the motor and configured to sense the meter shaft. A locating feature (such as a keyed interface) can be utilized in mounting the seed meter disc to the shaft, such that the position of the seed cells relative to the motor shaft position is pre-defined or known. Examples of the seed meter sensor include tooth encoders, Hall Effect sensors, and the like.

In another example, an optical sensor is utilized. For instance, one or more optical sensors can be positioned relative to slot(s) formed in the seed meter. As the disc rotates, the optical sensors detect the slots (e.g., an optical sensor detects light passing through a slot) as they pass by the optical sensor.

In another example, the seed meter sensor can be a proximity sensor configured to measure seed cells directly, or other features of rotatable element 200.

Figure 5:
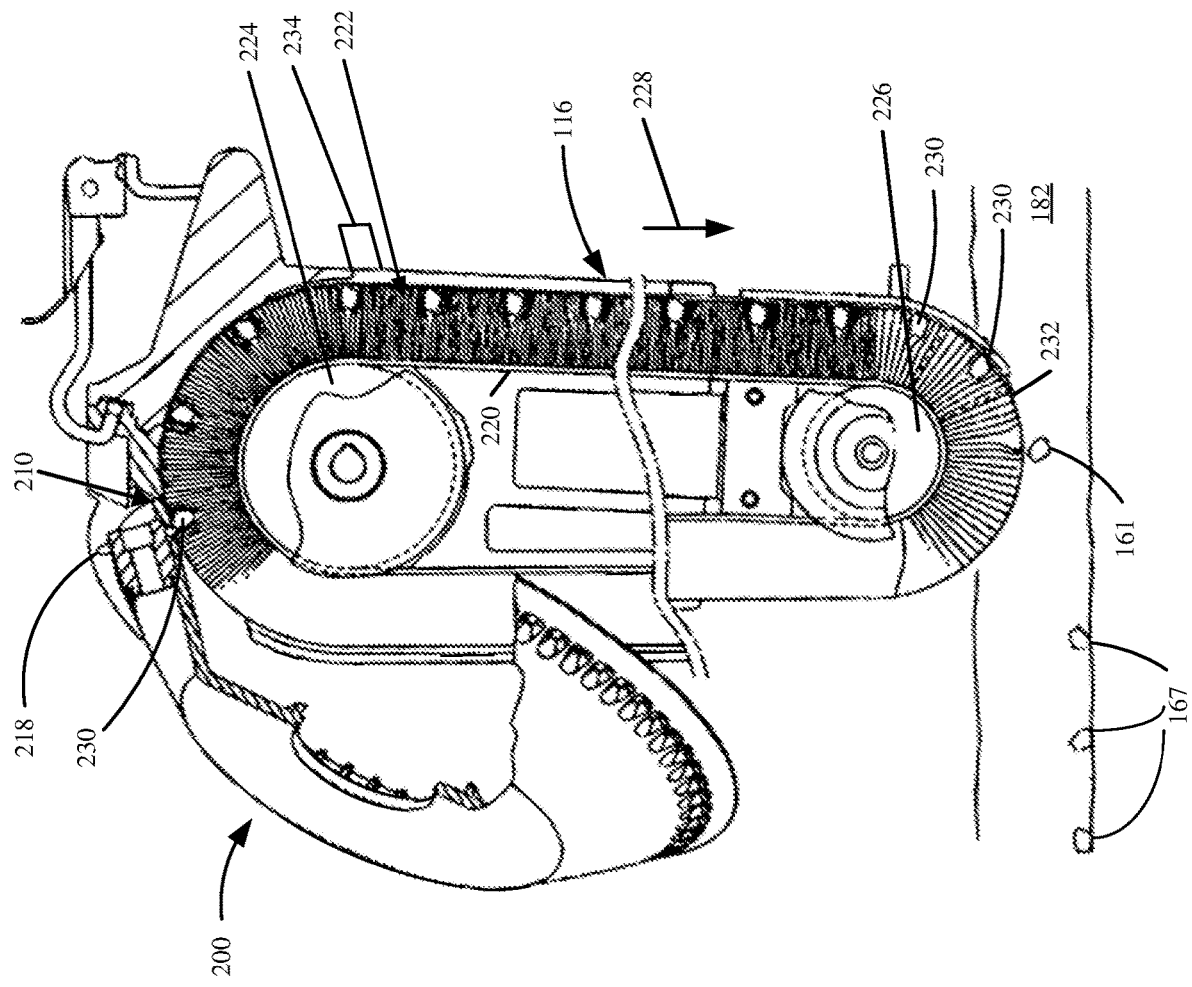
FIGS. 5 and 6 show two examples of different seed delivery systems that can be used with a seed metering system.

FIG. 5 shows an example where the rotating element 200 is positioned so that its seed discharge area 210 is above, and closely proximate, seed delivery system 116 which includes an assistive seed delivery or transport mechanism. In the example shown in FIG. 5, the seed transport mechanism includes a belt 220 with a brush that is formed of distally extending bristles 222 attached to belt 220. Belt 220 is mounted about pulleys 224 and 226. One of pulleys 224 and 226 is illustratively a drive pulley while the other is an idler pulley. The drive pulley is illustratively rotatably driven by a conveyance motor which can be an electric motor, a pneumatic motor, a hydraulic motor, etc. Belt 220 is driven generally in the direction indicated by arrow 228.

Therefore, when seeds 230 are moved by rotating element 200 to the seed discharge area 210, where they are discharged from the seed cells in rotating element 200, they are illustratively positioned within the bristles (e.g., in a receiver) 222 by the projections 202 following each aperture 204 and the projections 218 on knock-out wheel 216 that pushes the seed into the bristles 222. Seed delivery system 116 illustratively includes walls that form an enclosure around the bristles 222, so that, as the bristles 222 move in the direction indicated by arrow 228, the seeds 230 are carried along with the bristles 222 from the seed discharge area 210 of the metering mechanism, to a discharge area 232 where the seeds are discharged either at ground level, or below ground level within a trench or furrow 182 that is generated by the furrow opener 120, 164 on the row unit 106. Seed 161 is shown after being discharged from discharge area 232, and seeds 167 are shown after coming to rest in furrow 182.

Additionally, a sensor 234 is also illustratively coupled to seed delivery system 116. As the seeds are moved within bristles 222, sensor 234 can detect the presence or absence of a seed. It should also be noted that while the present description will proceed as having sensors 214 and 234, it is expressly contemplated that, in another example, only one sensor is used. Additional sensors can also be used.

Figure 6:
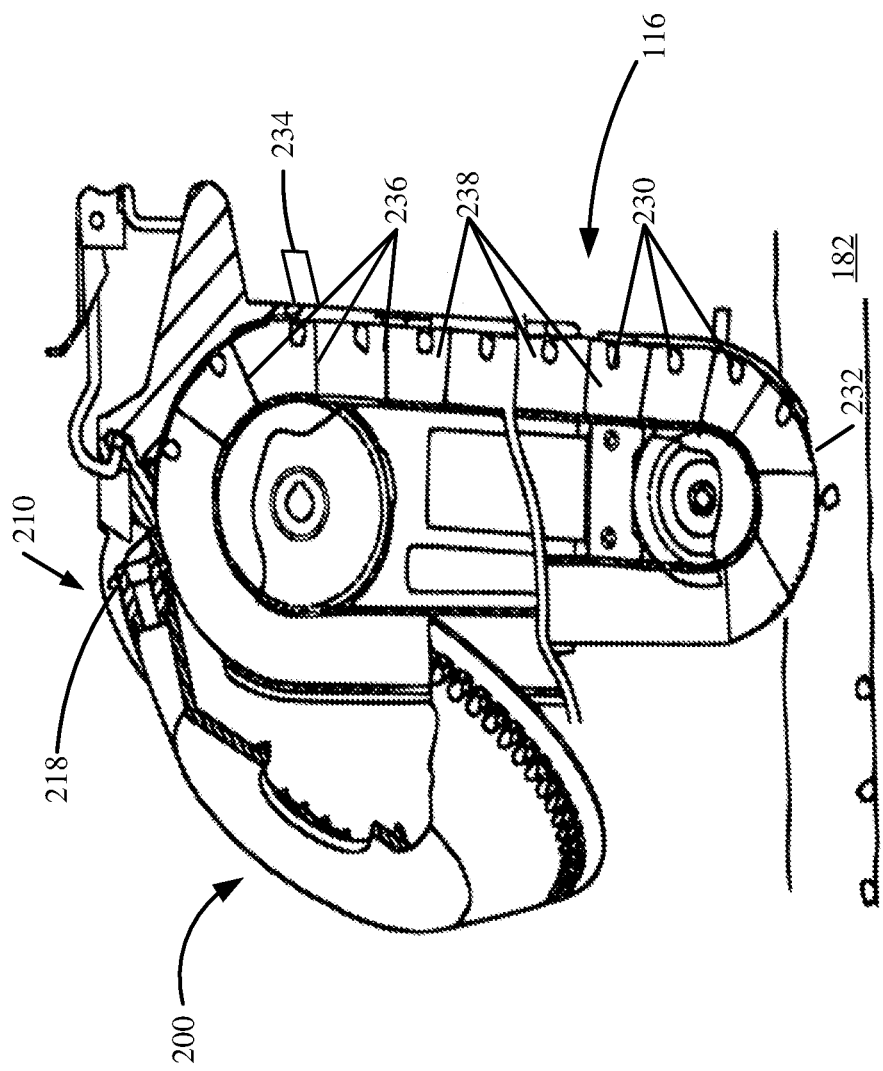

FIG. 6 is similar to FIG. 5, except that seed delivery system 116 is not formed by a belt 220 with distally extending bristles 222. Instead, the transport mechanism includes a flighted belt in which a set of paddles 236 form individual chambers (or receivers) 238, into which the seeds 230 are dropped from the seed discharge area 210 of the metering mechanism. The flighted belt moves the seeds 230 from the seed discharge area 210 to the discharge area 232 within the trench or furrow 182.

There are a wide variety of other types of delivery systems as well, that include a transport mechanism and a receiver that receives a seed. For instance, the delivery system can include dual belt delivery systems in which opposing belts receive, hold and move seeds to the furrow 182, a rotatable wheel that has sprockets which catch seeds from the metering system and move them to the furrow 182, multiple transport wheels that operate to transport the seed to the furrow 182, an auger, among others. The present description will proceed with respect to a brush belt, but many other delivery systems are contemplated herein as well.

As mentioned above, for a variety of reasons, significant deviations in the seed placement location or spacing (from a desired or optimal location or spacing) can occur. This can adversely affect yield, decreased field area utilization, and/or results in wasted seeds. The deviations can be caused by, for example, irregularities in the operation of seed metering system 114 (e.g., irregularities in the pressure differentials), variations in seed size and/or shape, foreign material in the seed system, etc. Even if seed delivery system 116 is matched or otherwise correlated to operation of seed metering system 114, the seeds may be placed at incorrect locations and spacings. Further, it may be desirable to place the seeds at a specific location relative to where the fertilizer or other material has already been placed. This an be very difficult without being able to place the seeds accurately.

The present description provides a processing and control system for an agricultural machine that is configured to control seed release to a target location relative to the location of fertilizer or other previously-placed material. In one example, the processing and control system does this by tracking individual seed movement through portions of the seeding system or planter.

Figure 7:
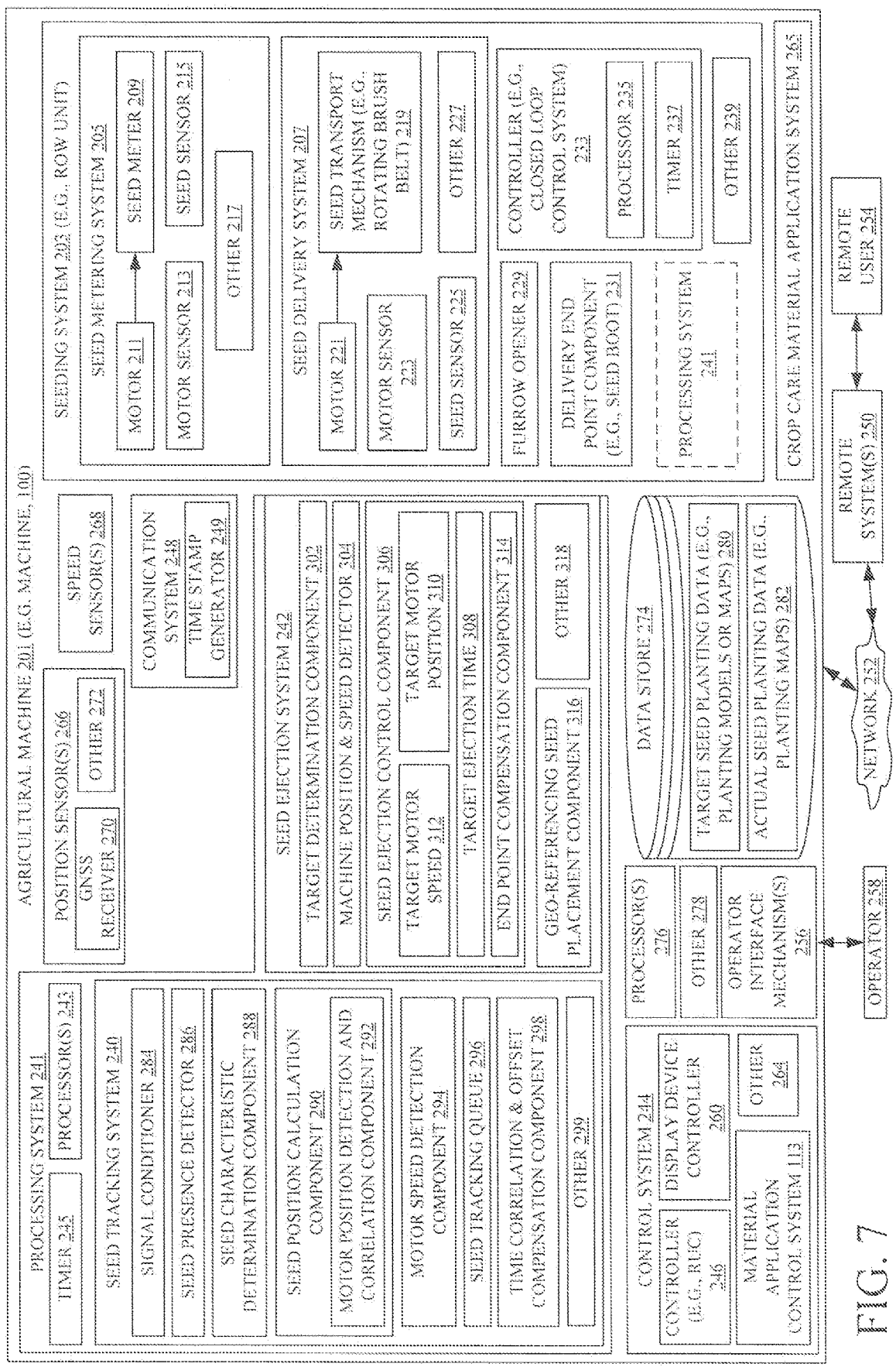
FIG. 7 is a simplified block diagram of one example of an agricultural machine architecture (or agricultural system).

FIG. 7 shows a block diagram of one example of an agricultural machine architecture (or agricultural system) including an agricultural machine 201 having a processing and control system that includes seeding system 203. One example of machine 201 includes machine 100 illustrated above with respect to FIG. 1. In the example shown in FIG. 7, each row unit 106 includes a seeding system 203 having a seed metering system 205 and a seed delivery system 207 disposed thereon or otherwise associated with the row unit 106. Agricultural machine 201 can also include processing system 241, control system 244, one or more processors 276, data store 274, operator interface mechanisms 256, position sensor(s) 266, speed sensor(s) 268, communication system 248, seed ejection system 242, crop care material application system 265, and other items 278. FIG. 7 also shows an operator 258 (which may be operator 92 in FIG. 1) interacting with operator interface mechanisms 256. FIG. 7 further shows machine 201 coupled to remote system(s) 250, which has remote user 254, through network 252.

Remote system 250 can be a wide variety of different types of systems. For example, remote system 250 can be a remote server environment, remote computing system that may be used, for example, by a remote user 254. Further, it can be a remote computing system, such as a mobile device, remote network, or a wide variety of other remote systems. Remote system 250 can include one or more processors or servers, a data store, and it can include other items as well.

Network 252 can be any of a wide variety of different types of networks, such as the Internet, a cellular network, a local area network, a near field communication network, or any of a wide variety of other networks or combinations of networks or communication systems.

Communication system 248 can include wireless communication logic, which can be substantially any wireless communication system that can be used by the systems and components of machine 201 to communicate information to other items, such as between seeding system 203, processing system 241, and/or control system 244. In one example, communication system 248 communicates over a CAN bus (or another network, such as an Ethernet network, etc.) to communicate information between systems 203, 241, and/or 244 or other items. This information can include the various sensor signals and output signals generated based on the sensor variables and/or sensed variables.

Position sensor(s) 266 are configured to determine a geographic position, heading, and/or route of machine 201. Position sensor 266 can include, but is not limited to, a Global Navigation Satellite System (GNSS) receiver 270 that receives signals from a GNSS satellite transmitter. Position sensor 266 can also include a Real-Time Kinematic (RTK) component that is configured to enhance the precision of position data derived from the GNSS signal from receiver 270. Illustratively, an RTK component uses measurements of the phase of the signal's carrier wave in addition to the information content of the signal to provide real-time corrections, which can provide up to centimeter-level accuracy of the position determination. Position sensor(s) 266 can include other items 272 as well.

Speed sensor(s) 268 are configured to determine a speed at which machine 201 is traversing a worksite (e.g., field or other terrain) during the planting operation. This can include sensors that sense the movement of ground engaging elements (e.g., wheels or tracks), sensors that sense axle speed, and/or can utilize signals received from other sources, such as position sensor(s) 266.

Machine 201 also includes a data store 274, one or more processors 276, and can include other items 278. Data store 274 can store any of a wide variety of different types of information. Illustratively, data store 274 stores target seed planting data (e.g., planting maps or other models) 280, actual seed planting data (e.g., planting maps) 282, and can store other data items as well.

Seed metering system 205 includes a seed meter 209 that is driven by a motor 211 to meter or otherwise singulate seeds from a seed source (such as a seed container or tank). One example of seed meter 209 is illustrated above with respect to FIG. 4.

Seed metering system 205 can include a seed meter sensor 213 configured to sense characteristics of seed metering system 205 and to generate a sensor signal indicative of a position of seed meter 209. For example, sensor 213 can directly sense seed meter 209 and/or it can sense motor 211 (or other component that drives seed meter 209), such as a speed and/or position of motor 211 (e.g., an angular position of a motor output shaft). Some examples of seed meter sensor 213 are discussed above. For instance, sensor 213 can include, but is not limited to, an angle encoder, a Hall Effect sensor, an optical sensor, or any of a wide variety of other sensors that generate a signal indicative of angular position. A seed presence sensor 215 (also referred to as seed sensor 215) can also be provided that senses the presence of seeds in seed meter 209, and can include other items 217 as well. One example of seed sensor 215 can be seed sensor 214 shown in FIG. 4.

Seed delivery system 207 includes an assistive seed transport mechanism 219 driven by a motor 221. Examples of seed transport mechanism 219 can be the brush belt and flighted belt illustrated above with respect to FIGS. 5 and 6, respectively.

Seed delivery system 207 can include a mechanism position sensor 223 configured to sense characteristics of seed delivery system 207 and to generate a sensor signal indicative of a position of an assistive seed transport mechanism 219. For example, sensor 223 can directly sense mechanism 219 and/or it can sense a motor 221 that drives mechanism 219.

For instance, sensor 223 can be integrated into motor 221, or provided separately (e.g., external to motor 221), and configured to sense operational characteristics of motor 221. For example, sensor 223 can be mounted, to a shaft of a gearbox, a pulley, and/or motor 221.

In one example, sensor 223 senses an angular position of an output shaft of motor 221, that is rotatably coupled to drive seed transport mechanism 219 to transport seeds, received from seed metering system 208, to a second or release position in which the seeds are released from the seed transport mechanism 219. Some examples of sensor 223 are discussed above. For instance, sensor 223 can include, but is not limited to, an angle encoder, a Hall Effect sensor, an optical sensor, or any of a wide variety of other sensors that generate a signal indicative of angular position.

It is noted that while separate motors 211 and 221 are illustrated in FIG. 7, in another example only one motor is used to drive both seed metering system 205 and seed delivery system 207. Further, seed delivery system 207 may also be seed tube 170 described above with respect to FIG. 3, in which case motor 221, motor sensor 223, and seed transport mechanisms 219 are not needed.

A seed presence sensor 225 (also referred to as seed sensor 225) is positioned along the transport route to detect the presence of seeds at the sensor location. Examples of seed sensor 225 include seed sensor 172 shown above in FIG. 3, and sensor 234 illustrated above in FIGS. 5 and 6. Seed sensor 225 is configured to generate and send a sensor signal indicative of the sensed seed presence. As used herein, a sensor signal includes both an analog signal and a digital signal, such as communications using a controller area network (CAN) bus.

In addition to sending an indication (e.g., a sensor signal) indictive of the presence of a seed in the seed transport mechanism 219, seed sensor 225 (or another sensor) can be configured to sense a characteristic of the seed, such as, but not limited to, a size, shape, color or other characteristic (such as an indication that the seed is cracked or otherwise irregular). Seed delivery system 207 can include other items 227 as well.

It is noted that while FIG. 7 illustrates seed sensors 215 and 225 in each of seed metering system 205 and seed delivery system 207, in one example only seed metering system 205 includes a seed sensor (or system 207 does not include a seed sensor) configured to sense the presence of seed as the seed passes the sensor location. In another example, only seed delivery system 207 includes a seed sensor (or system 205 does not include a seed sensor) configured to sense the presence of seed as the seed passes the sensor location.

In one example, seed sensor 215 (and/or seed sensor 225) includes an optical or reflective sensor and thus includes a transmitter component and a receiver component. In another example seed sensor 215 (and/or seed sensor 225) includes a mechanical sensor that senses the seed presence, or it can be another type of sensor that senses the presence of the seed.

The transmitter component emits electromagnetic radiation, into seed delivery system 207 in the case of a reflective sensor. The receiver component then detects the reflected radiation and generates a signal indicative of the presence or absence of a seed adjacent to the sensor based on the reflected radiation. With other sensors, radiation such as light, is transmitted through the seed delivery system 207. When the light beam is interrupted by seed, the sensor signal varies to indicate a seed. Thus, the sensor generates a seed sensor signal that pulses or otherwise varies, and the pulses or variations are indicative of the presence of a seed passing the sensor location proximate the sensor.

In the example of a rotating brush belt, such as the example shown above with respect to FIG. 5, bristles (e.g., bristles 222) absorb a majority of the radiation emitted from the transmitter component. As a result, absent a seed, reflected radiation received by the receiver is relatively low. Alternatively, when a seed passes the sensor location, more of the emitted light is reflected off the seed and back to the receiver component, indicating the presence of a seed. The differences in the reflected radiation allow for a determination to be made as to whether a seed is, in fact, present. Additionally, in other examples, a seed sensor can include a camera and image processing logic that provides visual detection as to whether a seed is present within seed delivery system 207, at the sensor location proximate the sensor.

Seeding system 203 (e.g., on a particular row unit 106) can also include a furrow opener 229 (such as furrow openers 120, 164) configured to form a furrow or trench in the ground, a delivery endpoint component 231 configured to deliver the seed into the furrow, and a controller 233. In one example, controller 233 provides a closed loop control system and can include a processor 235 and a timer 237, which can be used to time the performance of operations within seeding system 203. Of course, seeding system 203 can include other items 239 as well.

Agricultural machine 201 includes a processing system 241 having a seed tracking system 240 configured to track seed movement within seeding system 203 and a seed ejection system 242 configured to control, or to generate control signals that are used by a control system 244 to control, ejection of the seeds from component 231. It is noted that while processing system 241 is broken out separately in FIG. 7, some or all of the tracking and ejection control functions can be performed by seeding system 203. The illustration in FIG. 7 is for sake of example only.

As discussed in further detail below, processing system 241 is configured to control one (or both) of seed metering system 205 and seed delivery system 207 to place seeds at desired locations relative to previously-placed fertilizer or other material based on the speed of agricultural machine 201 and the position and/or speed of the respective system being controlled (i.e., 114 and/or 116), when seed is detected and when the seed is to be released from the respective system.

For sake of illustration, processing system 241 is configured to receive a sensor signal that represents the angular position of system 205 (e.g., seed meter 209 itself or motor 211 driving it) when seed sensor 215 senses a seed in seed meter 209. This angular position is correlated to the position of the sensed seed. Therefore, processing system 241 determines or tracks the location of the sensed seed along a conveyance path through seed metering system 205. System 241 can then calculate the angular distance (and/or time) it will take for system 205 (or seed meter 209) to rotate to a position where the seed exits seed metering system 205 (e.g., at seed discharge area 210), and is provided to seed delivery system 207. This position corresponds to the interface, or hand-off point, between systems 205 and 207.

By sensing the angular position of system 205, processing system 241 can determine the point in time at which a particular seed is released by seed metering system 205 and received by seed delivery system 207. Processing system 241 can then correlate the position of the particular seed to the angular position of system 207 (e.g., to the angular position of mechanism 219 itself or motor 221 driving it).

Before discussing processing system 241 in further detail, other components of machine 201 will be described.

In the example illustrated in FIG. 7, control system 244 is configured to control other components and systems of machine 201. For instance, control system 244 generates control signals to control communication system 248 to communicate between components of machine 201 and/or with other systems, such as remote system 250 over a network 252. Control system 244 includes row unit controller (RUC or controller) 246, display device controller 260, material application control system 113, and other items 264. Display device controller 260 can control interfaces, such as operator interface mechanisms 256 that include input mechanisms configured to receive input from an operator 258 and output mechanisms that render outputs to operator 258. The operator input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, other audio, visual, or haptic items, etc.

Control system 244 also is illustrated as including material application control system 113. Material application control system 113 is configured to control a crop care material application system 265 to control the application of chemicals, such as fertilizers, herbicides, pesticides, and the like. Thus, crop care material application system 265 can include actuator(s) 109, pump(s) 115, etc. that are discussed above and controlled by material application control system 113. System 113 can generate an output indicative of where and/or when material is applied to the field by system 265.

In the illustrated example, row unit controller 246 controls seeding system 203 based on processing performed by processing system 241 and based on where material is applied to the field as controlled by material application control system 113. This can include sending messages or other signals over any suitable communication mechanism, such as a CAN bus. Controller 246 can thus control, either directly or with controller 233, the seeding system on each row unit.

It is noted that in one example seeding system 203 (e.g., on a particular row unit) includes some (or all) of the components and related functionality described with respect to processing system 241. This is represented by the dashed block in FIG. 7.

Processing system 241 includes one or more processors 243, and seed tracking system 240. In one example, processor 243 implements a timer 245 utilized in conjunction with timer 237 of seed delivery system 207, to coordinate the sending and receiving of signals and messages between processing system 241 and seeding system 203. Also, the timers 237 and 245 can be utilized for the generation and application of control signals by control system 244 to seeding system 203, to control operation of seed delivery system 207 in transporting seeds to endpoint component 231. In one example, communication system 248 includes a timestamp generator 249. Timestamp generator 249 is configured to generate timestamps, using timers 237 and 245, on messages and signals sent by systems 207 and 241. The timestamps can be utilized by the receiving system to determine a latency in the communication channel.

Seed tracking system 240 illustratively includes a signal conditioner 284, seed presence detector 286, seed characteristic determination component 288, seed position calculation component 290 (which includes motor position detection and correlation component 292, motor speed detection component 294, seed tracking queue 296, time correlation and offset compensation component 298, and other items 299. Signal conditioner 284 receives signals generated by sensor 225 (and/or sensor 215), and to condition those signals for subsequent processing. Conditioning can include amplifying the generated sensor signal, performing filtering, linearization, normalization, and/or any other conditioning which can improve the quality of the sensor signal. The conditioned signal is then provided to other components of seed tracking system 240 such as, but not limited to, seed presence detector 286, seed characteristic determination component 288, and seed position calculation component 290.

Seed presence detector 286 receives the sensor signal, which may be conditioned, and determines whether a seed is present in the transport route of seed transport mechanism 219, at the location corresponding to seed sensor 225. Seed presence detector 286 can distinguish between seed sensor signals which indicate background noise (indicating an absence of seed) and a pulse (indicating the presence of a seed).

Seed characteristic determination component 288 is configured to detect a characteristic of the seed. For instance, component 288 can generate an output indicative of a size, shape, color, or other characteristic of the seed. This can be utilized to determine whether the detected seed is, instead, foreign material (and thus not an actual seed), or whether the seed may have an irregularity, such as being cracked, etc., that may affect its germination and subsequent growth.

Seed position calculation component 290 calculates the position of the seed in seed transport mechanism 219, thus facilitating tracking of movement of the seed through seed delivery system 207 as seed transport mechanism 219 (e.g., brush belt) is rotated by motor 221. Component 290 includes motor position detection and correlation component 292 which detects the angular position of the output shaft of motor 221, which can be coupled directly, through a transmission component, or otherwise, to seed transport mechanism 219. In either case, component 292 correlates the position of the detected seed to the angular position of the output shaft of motor 221.

A motor speed detection component 294 detects the speed of motor 221, as it rotates to move seed transport mechanism 219 and convey the seed along the transport route. Seed tracking queue 296 stores tracking information for each seed whose presence is detected by detector 286. In one example, seed tracking queue 296 stores a plurality of data records or other data items that identify each seed individually, along with information that correlates the position of the seed to the position of mechanism 219 for position tracking of the individual seed. For instance, a two-dimensional array of values can be stored representing seed and mechanism (e.g., belt) position. The information in seed tracking queue 296 can be utilized to identify a number of seeds that are presently in seed transport mechanism 219, as well as the spacings between each seed and a magnitude of rotation of the output shaft of motor 221 needed to move that seed to the release point, to release the seed toward endpoint component 231.

Depending on the type of communication channel utilized by communication system 248, latencies may be introduced in the communications. For example, a typical CAN message-based communication has latency delays on the order of 5 milliseconds. The time correlation and offset compensation component 298 correlates each message or other communication sent between processing system 241 and seeding system 203 using timestamps generated by the timestamp generator 249. Component 298 thus accounts for these latencies, by compensating for timing offsets.

Seed ejection system 242 includes a target determination component 302, machine position and speed detector 304, seed ejection control component 306, geo-referenced seed placement component 316 and other items 318. Seed ejection control component 306 includes target motor speed 312, target motor position 310, target ejection time 308 and end point compensation component 314. Target determination component 302 identifies a target or target parameter for ejecting each seed from seed delivery system 207. The target or target parameter can represent any of a variety of different types of parameters. In the illustrated example, but not by limitation, the target is a target geographic location on the terrain (field) and may be identified relative to the location of previously-placed fertilizer or other material). In one example, the target geographic location is referenced to an absolute location in the field, such as using global coordinates in a global coordinate system (e.g., World Geodetic System (WGS)). In one example, the target geographic location is referenced to local coordinates in the field.

Further, target locations for seed placement can be pre-defined (e.g., a target planting map) based on fertilizer or other material locations. Alternatively, or in addition, the target or target parameter for seed placement is determined in situ or "on-the-fly" based on the application of fertilizer or other material. In one example, target location for placement of a next seed is determined based on a location and/or characteristic of a prior seed ejected by seed system 202 and the location and/or characteristic of fertilizer or other already-applied material.

The location or timing of previous fertilizer application or other material application can be identified based on an output from material application control system 113 or in other ways. That location or timing can then be used by target determination component 302 to identify the target parameter indication how the seed metering system 205 and/or seed delivery system 207 should be controlled to deliver seed to the furrow 182.

Machine position and speed detector 304 detects the geographic position of machine 201 using signals from position sensor(s) 266 and determines the speed of machine 201 based on signals from speed sensor(s) 268.

Seed ejection control component 306 generates a motor operating parameter to control motor 221 to eject each seed based on the target parameters determined by target determination component 302. In the illustrated example, component 306 identifies, for each individual seed in mechanism 219, a target ejection time (or timing) 308 for releasing the seed from component 231, a target motor position 310 corresponding to target ejection time 308, and a target motor speed 312 corresponding to target ejection time 308.

Target ejection time (or timing) 308 is determined based on the target location or other target parameter for the seed placement and the current machine position and machine speed. That is, the target ejection time (or timing) 308 represents the time (or time offset from a known time) at which the next seed in mechanism 219 is to be released so that it is placed in the furrow at the target location or according to another target parameter which is, itself, determined based on a location or timing and/or other characteristic of previously-placed fertilizer or other material.

In one example, determination of target ejection time (or timing) 308 is compensated for a time delay between when the seed is released from seed transport mechanism 219 and the seed is deposited in the furrow by delivery endpoint component 231. Accordingly, an endpoint compensation component 314 generates an estimation of an amount of time that it will take the seed to pass from seed transport mechanism 219 (after release) through delivery endpoint component 231 and reach the furrow. This time delay can vary based on the distance to, and geometry of, component 231.

For sake of illustration, but not by limitation, assume that component 314 determines that it will take approximately one-half second for the seed to reach the furrow, once released from mechanism 219. Here, target ejection time 308 is calculated so that the seed is released approximately one-half second before component 231 (e.g., seed boot) is at the target location (taking into account the current machine position and the machine speed).

Component 306 identifies target motor position 310 for releasing the seed at the target ejection time 308. Illustratively, the target motor position 310 represents an angular rotational position of the output shaft of motor 221 at which mechanism 219 will be at a position in which the given seed will be released from mechanism 219 toward component 231. In one example, target motor position 310 is calculated based on a predefined rotational range over which the output shaft of motor 221 must rotate to move the portion of mechanism 219 containing the seed from the sensor location to the release location.

Component 306 identifies target motor speed 312 based on an offset instantaneous speed of mechanism 219 when the seed is released. This offset speed determines the velocity of the seed (relative to the row unit) when the seed is released. In one example, the target motor speed 312 is determined based on the machine speed. For instance, target motor speed 312 is selected so that the speed of transport mechanism 219 (and thus the speed of the seed when it is released) matches and thus offsets the speed of machine 201 so the seed is ejected rearwardly relative to the direction of travel of machine 201 at the same speed that machine 201 is traveling. The offset speed thus discourages, if not prevents, the seed from rolling in the furrow.

A geo-referencing seed placement component 316 is configured to generate a geo-referenced placement indicator that indicates the actual placement location of each seed. For example, when each seed is released from seed delivery system 207, component 316 determines the actual planting location of that seed by correlating it to GPS coordinates (or otherwise). This information can be stored as actual seed planting location data 282. Of course, system 242 can include other items 318 as well.

Figure 8:
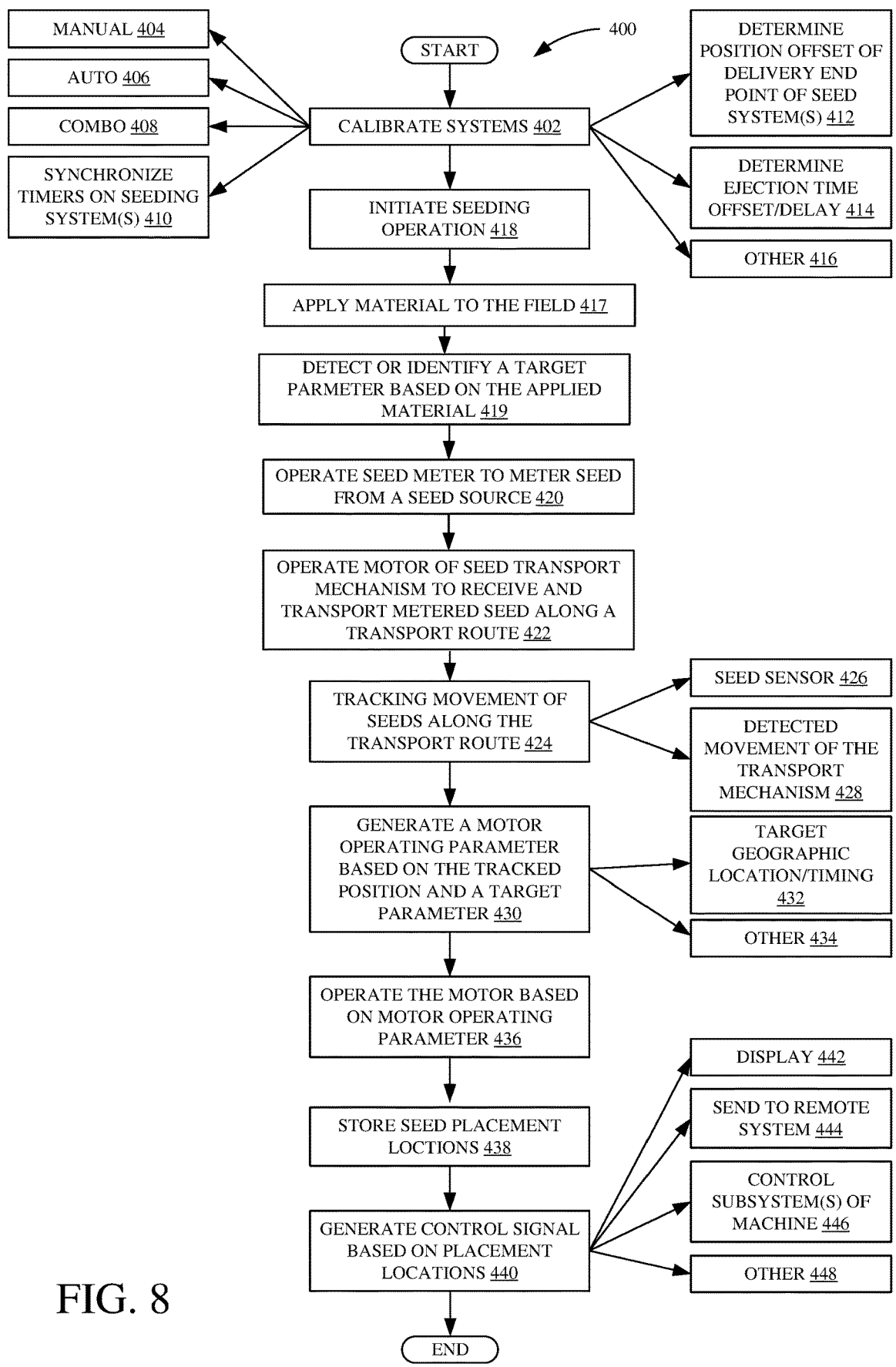
FIG. 8 is a flow diagram of one example operation of an agricultural machine.

FIG. 8 is a flow diagram 400 illustrating an example operation of an agricultural machine. For sake of illustration, but not by limitation, FIG. 8 will be described in the context of agricultural machine 201 illustrated in FIG. 7.

At block 402, the systems of machine 201 are calibrated or otherwise configured for operation. This can be done manually (represented by block 404), automatically (represented by block 406), or a combination of manual or automatic processes (block 408).

In one example, block 402 includes synchronizing timers 237 and 245, which are utilized for sending and receiving control signals and messages between processing system 241 and seeding system 203. Synchronizing timers is represented by block 410. In one example, timers 237 and 245 comprise parallel independent clocks running on corresponding processing units that are synchronized in time on the order of ten to one hundred microseconds. Timers 237 and 245 can be synchronized in any of a variety of ways. A message or other signal is sent between systems 203 and 241 using any suitable communication protocol. In one example, a separate physical hardware bus provides a signal line between the systems for timer synchronization. Of course, this is only one example. After timer synchronization, a message sent by a sending one of the systems includes a timestamp generated (using timestamp generator 249) based on a time of the timer (237 or 245) of the sending system. The timer (237 or 245) of the receiving system can then be utilized to determine latency in the communication of the message through the communication channel. The receiving system can then account for a latency delay, in particular when using communication protocols such as CAN message-based communication. Further, the timestamps and corresponding timer(s) can be used to extrapolate values to use between the sending and receiving of the messages.

For the sake of illustration, as noted above CAN bus messages are often limited by sampling rate. Timestamps can be bundled with the data broadcast in the CAN messages to enable the receivers of the data to extrapolate higher accuracy data, such as position or time estimates. For instance, assume a scenario in which motor sensor 223 sends periodic messages indicating the angular position of the output shaft of motor 221. If each of these messages is timestamped based on the current value of timer 237, then using the value of timer 245 processing system 241 can extrapolate the position at intervening times between those messages. Thus, if a seed is detected by seed sensor 225 at a time between the messages sent by sensor 223, then processing system 241 can accurately determine the position of the seed relative to the motor output shaft by extrapolating the position of the output shaft from the timestamped messages sent by sensor 223.

Likewise, a corresponding extrapolation process can be utilized to determine seed spacing between adjacent seeds in seed transport mechanism 219 by using the detected velocity of seed transport mechanism 219 (based on signals from sensor 223) and timestamps of the corresponding seed presence signals generated by seed sensor 225, for those adjacent seeds.

It is worth noting that, in some implementations, motor 221 can be directly coupled to seed transport mechanism 219. In other examples, the output shaft of motor 221 can be coupled to seed transport mechanism 219 through a transmission, such as a set of gears at a particular gear ratio. The gear ratio of the transmission can be utilized to determine the position of the seed transport mechanism 219, and thus seeds carried along the transport route, relative to the position of the output shaft of motor 221.

At block 412, a position offset of each delivery endpoint component (i.e., the delivery endpoint component 231 on each row unit) is determined. The position offset represents a difference between the position sensed by the position sensor (i.e., position sensor 266 in FIG. 7) associated with machine 201 and the particular location of the endpoint component 231. The position sensor may be located on a central frame of machine 201, on a support vehicle such as a towing tractor, or otherwise. The position offset represents a multi-dimensional coordinate displacement from that sensor location. Using the position offset, the precise location of each endpoint component 231 can be determined based on the sensor signal generated by the position sensor 266.

At block 414, an ejection time offset or delay is determined based on the characteristics of seed delivery system 266. As mentioned above, an ejection time offset or delay represents an estimated time that it will take a seed that is released from seed transport mechanism 219 to reach the furrow. This offset or delay is based, at least in part, on the size, shape, and/or geometry of the delivery endpoint component 231, and any intermediate components that connect component 231 to the release position of mechanism 219. Of course, the systems can be calibrated in other ways as well, as represented by block 416.

At block 418, a seeding operation is initiated. The operation can be initiated manually based on inputs from operator 258, automatically, or otherwise. Material application control system 113 can control crop care material application system 265 to apply material to a location on the field, as indicated by block 417. The material can be fertilizer or other material applied to the surface of the field, or to a furrow opened, ahead of the seed delivery end of the delivery end point component 231 of the seed delivery system 207. The material may be applied during a prior operation as well.

The target parameter is then identified by target determination component 302, as indicated by block 419. The target parameter may be a globally referenced or locally referenced geographic location where the seed is to be placed based on the location of the applied material. The target parameter may be a timing for seed delivery, based on when the material was applied and based on a delay between when the material is applied and when the delivery end of the delivery end point component 231 of the seed delivery system 207 will be in position to eject the seed at the desired location relative to where the material is placed. Once the seeding operation is initiated, seed meter 209 is operated to meter seed from a seed source, such as a seed tank or container to an interface between seed metering system 205 and seed delivery system 207, where the seed is handed off to seed transport mechanism 219, as represented by block 420.

At block 422, motor 221 of seed delivery system 207 is operated to move seed transport mechanism 219 to transport the metered seed, received from seed meter 207, along a transport route to a second, release position in which the seed is released. Movement of the seeds along the transport route is tracked at block 424. The seeds can be tracked based on a seed presence signal (indicative of seed presence at the sensor location) received from seed sensor 225 and detected by seed presence detector 286, as is represented by block 426. The movement of the seeds can also be tracked based on detected movement of transport mechanism 219. In one example, this tracking is based on a signal from sensor 223, which indicates the change in angular position of the output shaft of motor 221, which in turn indicates the amount of movement of seed transport mechanism 219 (e.g., the bristles in the case of a brush belt) along the transport route for a given time period. Tracking this movement is represented by block 428.

As noted above, in the case where a transmission couples motor 221 to seed transport mechanism 219, movement of the transport mechanism can be detected based on the angular change is position of the output shaft of motor 221, taking into account a gear ratio between the output shaft and mechanism 219.

At block 430, a motor operating parameter is generated based on the tracked position of the seed and the target parameter for releasing the seed onto the terrain (e.g., into the furrow created by furrow opener 229). In one example, a target parameter includes, or is otherwise indicative of, a target geographic location or timing for ejecting the seed. The target parameter can be a global or absolute geographic location, such as latitude and longitudinal coordinates, or can be relative to a particular location on the terrain (such as a location relative to the location of a fertilizer or other material placement), or a timing parameter based on when the fertilizer or other material was placed. The motor operating parameter can be generated in other ways as well, as represented by block 434. At block 436, motor 221 is operated to drive movement of seed transport mechanism 219 based on the motor operating parameter.

At block 438, seed placement locations for the seeds are stored. In one example, this information is stored as planting maps 282 in data store 274. A planting map 282 represents the actual seed planting locations as, for example, a dot matrix or other suitable representation. A planting map 282 can also store the fertilizer or other material locations and can be utilized during a subsequent spraying operation, a subsequent harvesting operation, and/or a planting operation in a subsequent year. For example, it may be that the harvesting operation utilizes the information as estimated yield data for specific areas of the field. In another example, planting operations in a subsequent year may use the planting maps from the prior year so that crop rows are placed in an area of the field that resides between the crop rows from the prior year.

At block 440, a control signal is generated based on the seed placement locations. In one example, the control signal can control a display on, or associated with, machine 201 to display the seed placement locations, as is represented by block 442. Alternatively, or in addition, the seed placement location information can be sent to remote system 250, as represented by block 444. In another example, subsystems of machine 201 can be controlled, as represented by block 446. Control systems can be generated in other ways as well, as is represented by block 448.

Figure 9:
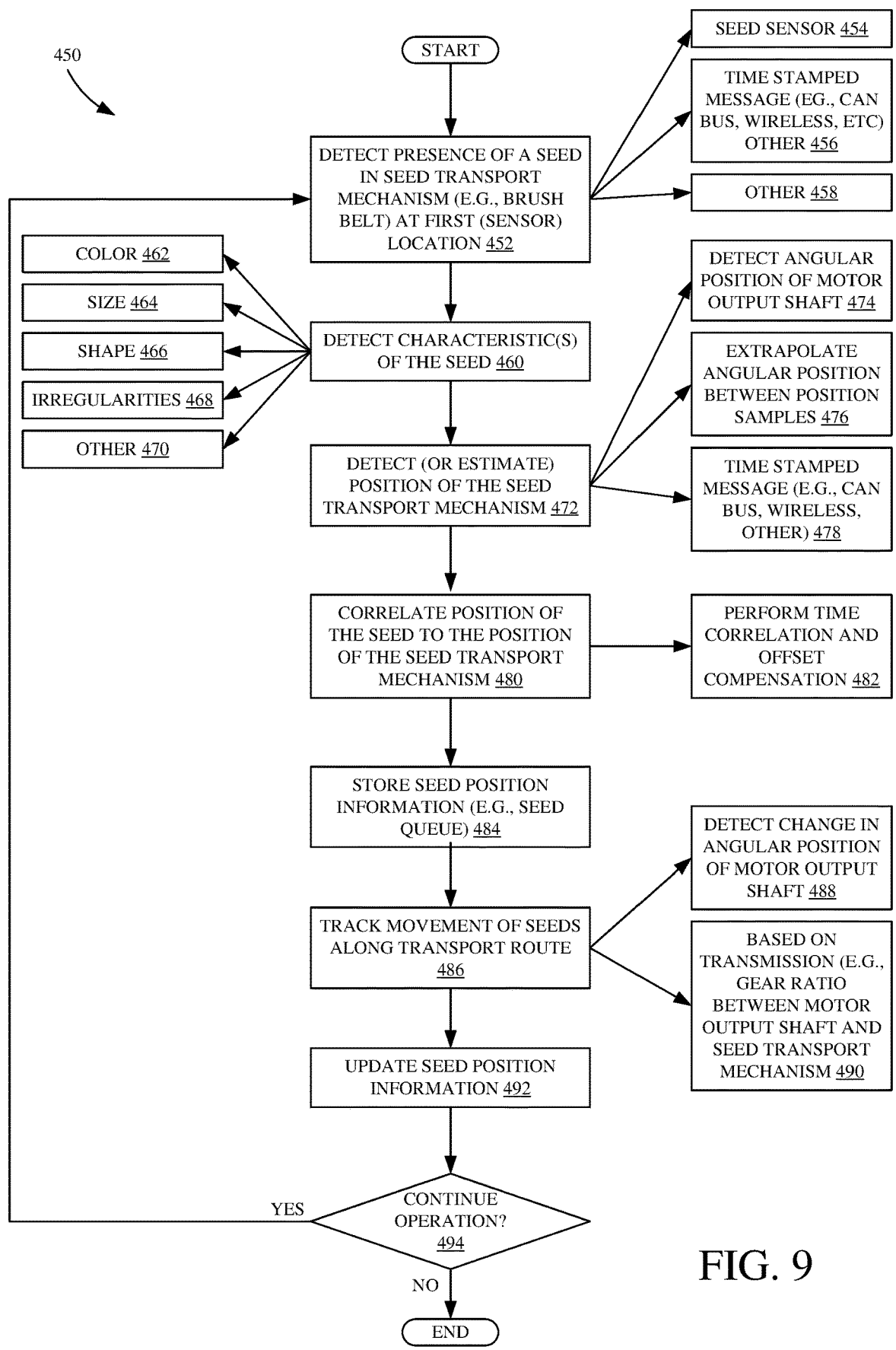
FIG. 9 is a flow diagram of one example operation of a seed tracking system.

FIG. 9 is a flow diagram 450 illustrating one example of operation of a seed tracking system. For sake of illustration, but not by limitation, FIG. 9 will be discussed in the context of seed tracking system 240 illustrated in FIG. 7.

At step 452, presence of a seed in seed transport mechanism 219 is detected at a first (sensor) location (e.g., at the location of sensor 234 in FIG. 5). In the illustrated example, detecting seed presence is based on a signal generated by seed sensor 225, which is indicated by block 454. In one example, a time-stamped message is received from controller 233 through communication system 248, where the time stamp may be generated using timestamp generator 249. The timestamp is indicative of a time of timer 237 when the seed presence was detected, as represented by block 456. Presence of the seed can be detected in other ways as well, as represented by block 458.

In one example, a characteristic of the seed can be detected, as represented by block 460. For example, seed sensor 225 (and/or another sensor) can generate a signal indicative of a color (block 462), a size (block 464), a shape (block 466), and/or irregularities (block 468) of the seed. Other characteristics can be detected as well, as represented by block 470.

Based on the characteristics detected at block 460, seed characteristic determination component 288 can determine that the seed detected a block 452 is a typical seed, is an atypical seed (it has irregularities, such as being cracked) and/or is likely not a seed (e.g., foreign material, such as a different type of seed).

At block 472, a position of the seed transport mechanism is detected or estimated. The position can be detected or estimated based on detecting the angular position of the motor output shaft, which is indicated by block 474. Alternatively, or in addition, the angular position of the output shaft can be extrapolated based on other detected angular positions, as is represented by block 476. For example, if the position of the motor output shaft is sampled every 10 milliseconds, then the position of the output shaft between those samples can be extrapolated based on the sampled positions and corresponding rotational speed.

At block 478, the position information is received from controller 233 in a time-stamped message, that is time-stamped by timestamp generator 249 based on timer 237. As discussed above, the timestamps can be utilized to account for latency in the communications through communication system 248.

At block 480, based on a valid seed detection, the position of the seed is correlated to the position of the seed transport mechanism. For example, block 480 associates the angular position of the motor output shaft, at the time the seed is detected by seed sensor 225, with the location of the seed at the sensor location. In one example, this association includes component 298 performing time correlation and offset compensation, examples of which are discussed above, as is represented by block 482.

At block 484, the seed position information is stored, for example in seed tracking queue 296. In this example, at a given moment in time, seed tracking queue 296 stores representations of each seed currently in seed transport mechanism 219, and corresponding position information, correlated to the angular rotation position of the motor output shaft.

At block 486, seed tracking system 240 tracks movements of the seeds along the transport route, as seed transport mechanism 219 is moved by motor 221. In this example, the movement is tracked based on a detected change in the angular position of the motor output shaft, which is represented by block 488. Also, the movement can be tracked, taking into account any gear ratio or other transmission change between motor 221 and seed transport mechanism 219, as is represented by block 490.

At block 492, the seed position information in seed tracking queue 296 is updated to reflect the new position information based on the movement tracked at block 486. At block 494, operation is continued for any subsequent seeds that are detected by the seed sensor.

Figure 10:
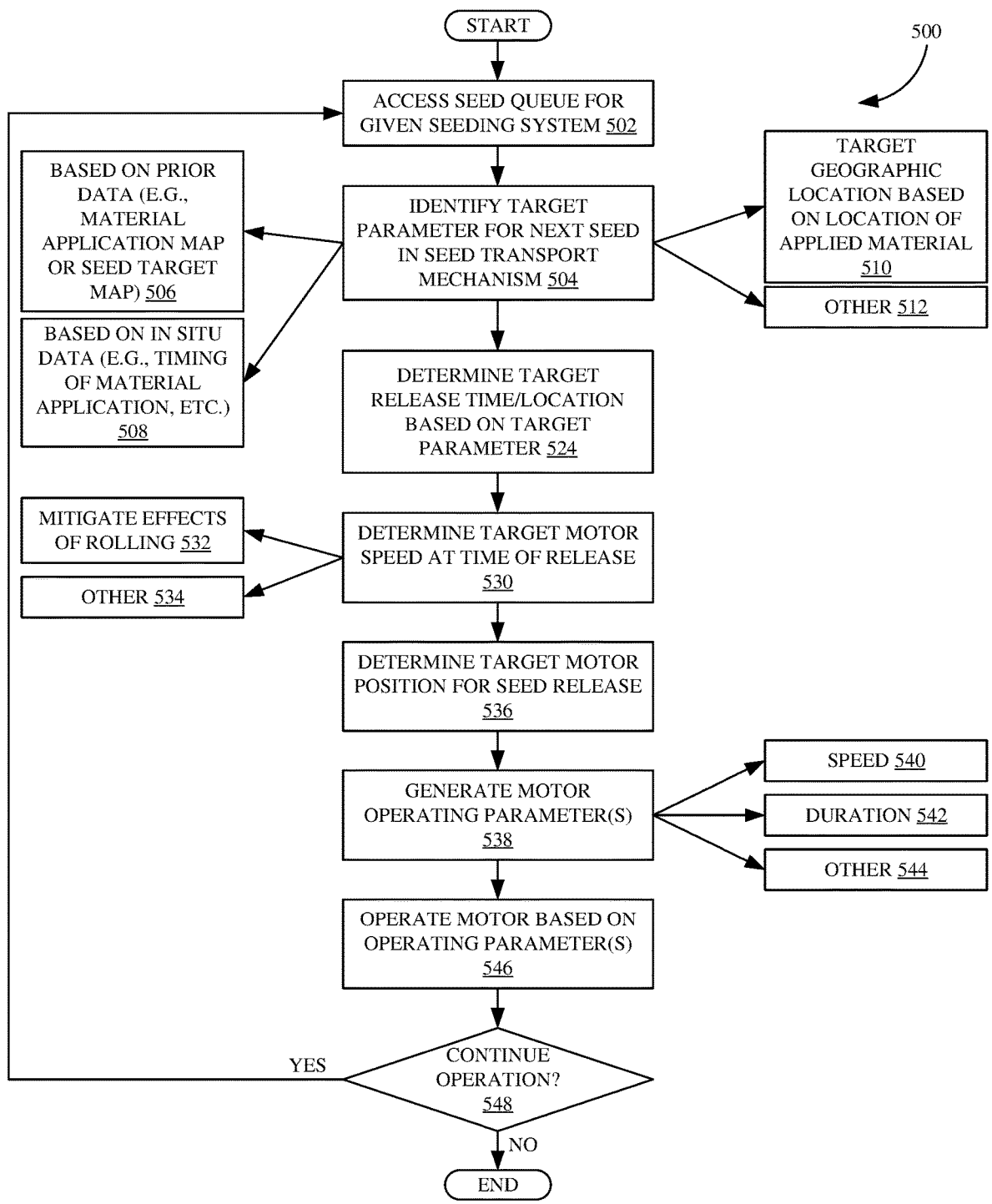
FIG. 10 is a flow diagram of one example operation of controlling a seeding system based on tracked seed movements.

FIG. 10 is a flow diagram 500 illustrating one example of controlling a seeding system based on tracked seed movements. For sake of illustration, but not by limitation, FIG. 10 will be discussed in the context of seed ejection system 242 illustrated in FIG. 7.

At block 502, a seed tracking queue is accessed for a particular seeding system. In one example, as noted above, seeding system 203 corresponds to a particular row unit, of a plurality of row units, on machine 201. Thus, the operation shown in FIG. 10 can be performed for each row unit, on a separate row unit-by-row unit basis.

Based on the seed tracking queue for seeding system 203, a target parameter is identified for a next seed in seed transport mechanism 219, as represented by block 504.

The target parameter is based on prior placement of material such as fertilizer or other material and can be identified in any of a number of ways. In one example, the target parameter is based on prior data, such as a map of prior material placement that can be used to generate a pre-defined seed target map. A seed target map can take a variety of different forms. In one example, the seed target includes a dot matrix or other model that identifies specific geographic locations of individual seeds, as represented by block 506. Alternatively, or in addition, the target parameter can be identified based in situ data, such as the sensed timing of the material applied to the field by the row unit, itself, and how that timing affects the timing or location for the seed placement, as represented by block 508. Sensors on or otherwise associated with machine 201 can obtain this data as the planting operation occurs.

The target parameter identifies, in one example, a geographic target location for the seed, as represented by block 510. As noted above, the target location can be a global geographic position, such as a position represented by longitude and latitude coordinates on a global coordinate system. In another example, the target location can represent a spacing (or offset) from the location of a previously-applied material.

For sake of illustration, material application control system 113 can generate control signals to control actuation of value 109 and generate an output indicative of that actuation based on the sensed speed of the machine 201 and the known or sensed delay between actuation of valve 109 and when the material hits the ground. The timing of when the next seed should be ejected can be calculated and used by seed ejection system 242 to eject the next seed at a location that is in a desired relationship with (e.g., spaced from or the same as) the location of the applied material. In another using the information indicative of the speed of machine 201, the actuation of valve 109, and the delay between valve actuation and the material hitting the ground, along with the geographic location and heading of machine 201, target determination component 302 may identify a geographic location of the material and/or the target geographic location for the seed and seed ejection system 242 can then eject the seed based on that target location.

The target parameter can be identified in other ways as well, as represented by block 512.

Based on the target parameter identified at block 504, the location of delivery endpoint component 231 determined based on the position offset, and the machine speed, a target ejection or release time/location is determined at block 524. As noted above, this can be based on endpoint timing compensation so the target ejection time/location can take into account an estimated amount of time (or change in location) it will take the seed to travel into the furrow after it is released from seed transport mechanism 219. The target ejection time/location can be determined in other ways as well.

At block 530, the target motor speed at the time of seed release is determined. In one example, the target motor speed is set so that the speed of the seed, as it is released from seed transport mechanism 219, conforms to (e.g., closely matches, but is in the opposite direction of) the speed of machine 201 to mitigate the effects of the seed rolling along the furrow, which may cause the seed to deviate from the target geographic location, as represented by block 532. The target motor speed can be determined in other ways as well, as represented by block 534.

At block 536, a target motor position is determined for the release of the seed. The target motor position is illustratively the angular position of the motor output shaft when the seed is at the release position of the seed transport mechanism 219, such that it is ejected from seed transport mechanism 219.

At block 538, motor operating parameters are generated based on the determinations at blocks 524-536. The motor operating parameters can include a motor speed for driving seed transport mechanism 219, as represented by block 540. Also, the motor operating parameter can include a duration for operating the motor at the particular speed, as represented by block 542. Of course, other motor operating parameters can be generated as well, as represented by block 544.

In one example, the motor operating parameters generated at block 538 indicate a series of motor adjustments, so that the motor increases speed so the seed approaches the release location relatively quickly, in accordance with the target release time, and then slows to more closely match the machine speed to mitigate the effects of rolling. In other words, the speed at block 540 can be greater than the target motor speed determined at block 530, and then, prior to the seed release, the motor is slowed to the target motor speed. This is just one example.

At block 546, the motor is operated based on the operating parameters. In one example, this includes controller 246 sending the motor operating parameters to controller 233, which controls motor 221 in accordance therewith.

If the operation is continued at block 548, the operation returns to block 502 where a next seed in the queue is identified and the seed transport mechanism 219 is operated to release the next seed at the next target geographic location.

It can thus be seen that locations where fertilizer or other material has been placed are identified and seeds are then accurately placed relative to the locations where the fertilizer or other material has been placed. This provides significant advantages, especially when the seeds are to be placed on top of the fertilizer or other material during planting. Also, in some systems, seed placement may be more accurate than fertilizer or other material placement. Therefore, by controlling seed placement based on locations where fertilizer or other material has been placed, the placement of the seed relative to the fertilizer or other material can be performed more accurately. In one example, but not by limitation, individual seeds are detected and tracked within the transport mechanism (e.g., seed tube or brush belt). By tracking the seed individually, the transport mechanism can be controlled in a manner that facilitates precision location planting.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. The processors, processing systems, controllers, and/or servers are functional parts of the systems or devices to which they belong and are activated by, and facilitate the functionality of the other components or items in those systems.

Also, a number of user interface displays (UIs) have been discussed. The UIs can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
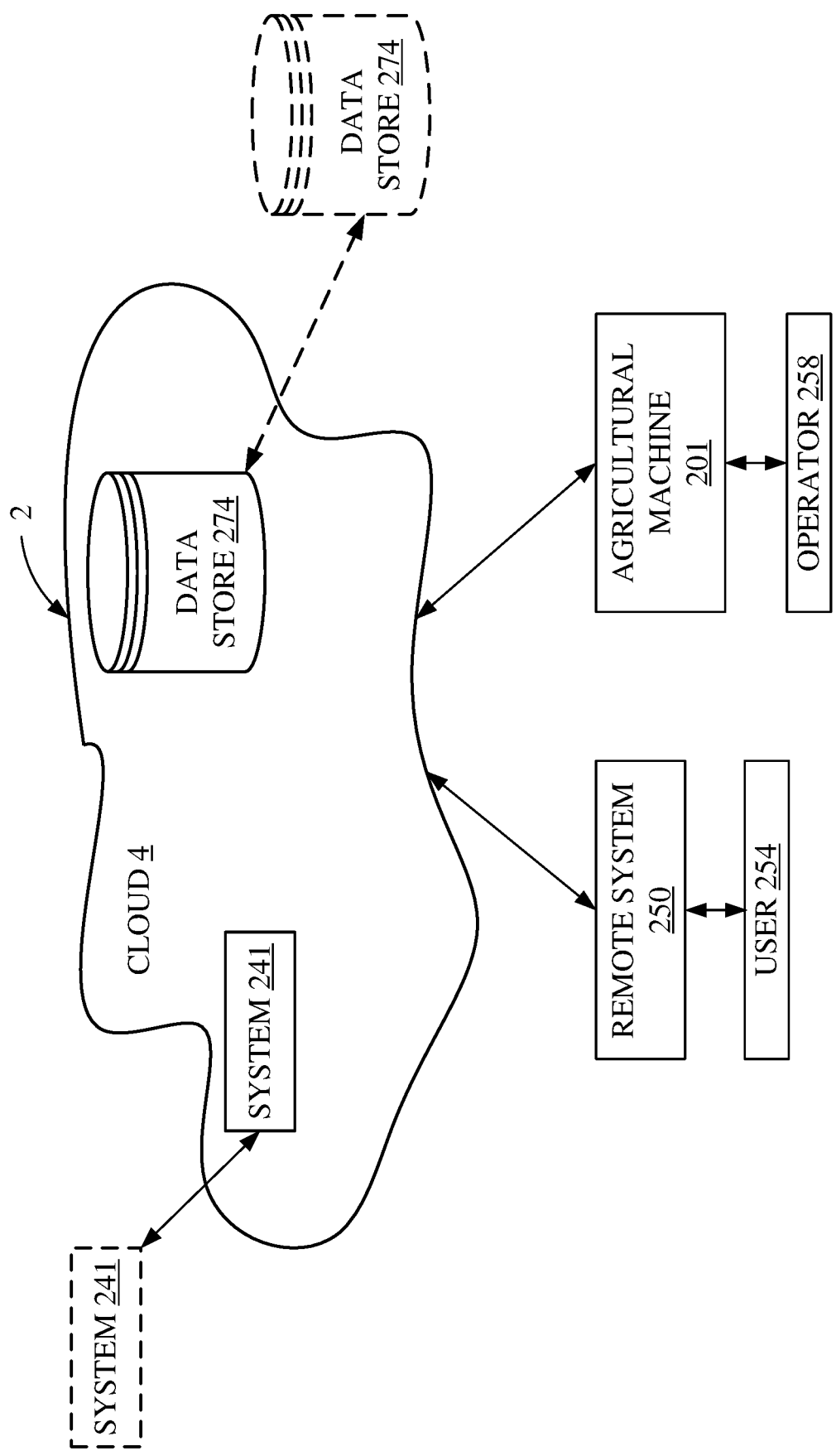
FIG. 11 is a block diagram showing one example of the architecture illustrated in FIG. 7, deployed in a remote server architecture.

FIG. 11 is a block diagram of one example of the agricultural machine architecture, shown in FIG. 7, where agricultural machine 201 communicates with elements in a remote server architecture 2. In an example, remote server architecture 2 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 7 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 7 and they are similarly numbered. FIG. 11 specifically shows that system 241 and data store 274 can be located at a remote server location 4. Therefore, agricultural machine 201 accesses those systems through remote server location 4.

FIG. 11 also depicts another example of a remote server architecture. FIG. 16 shows that it is also contemplated that some elements of FIG. 7 are disposed at remote server location 4 while others are not. By way of example, data store 274 can be disposed at a location separate from location 4, and accessed through the remote server at location 4. Alternatively, or in addition, system 241 can be disposed at location(s) separate from location 4, and accessed through the remote server at location 4.

Regardless of where the items in FIG. 11 are located, they can be accessed directly by agricultural machine 201, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 7, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
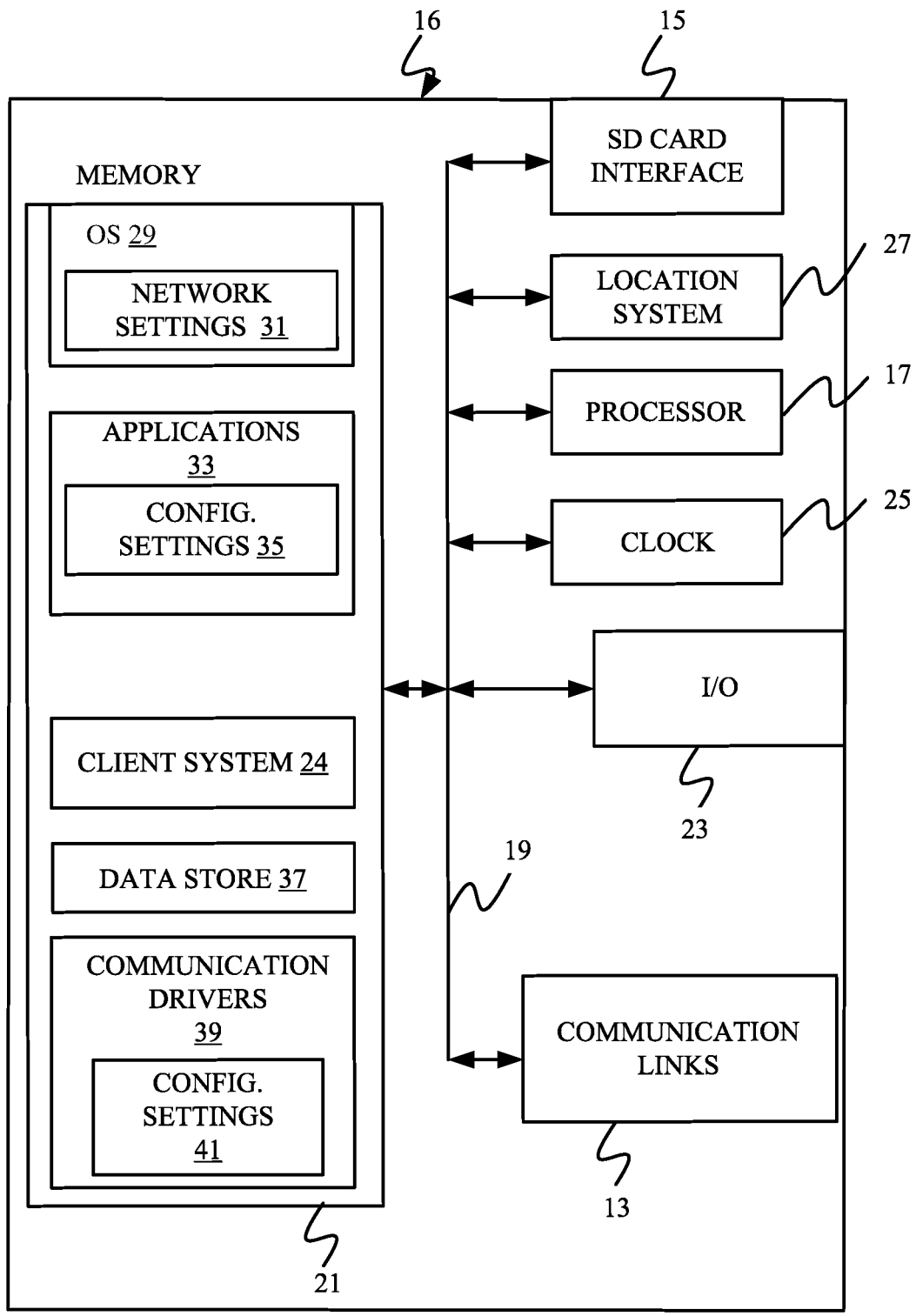
FIGS. 12-14 show examples of mobile devices that can be used in the architectures shown in the previous figures.
Figure 13:
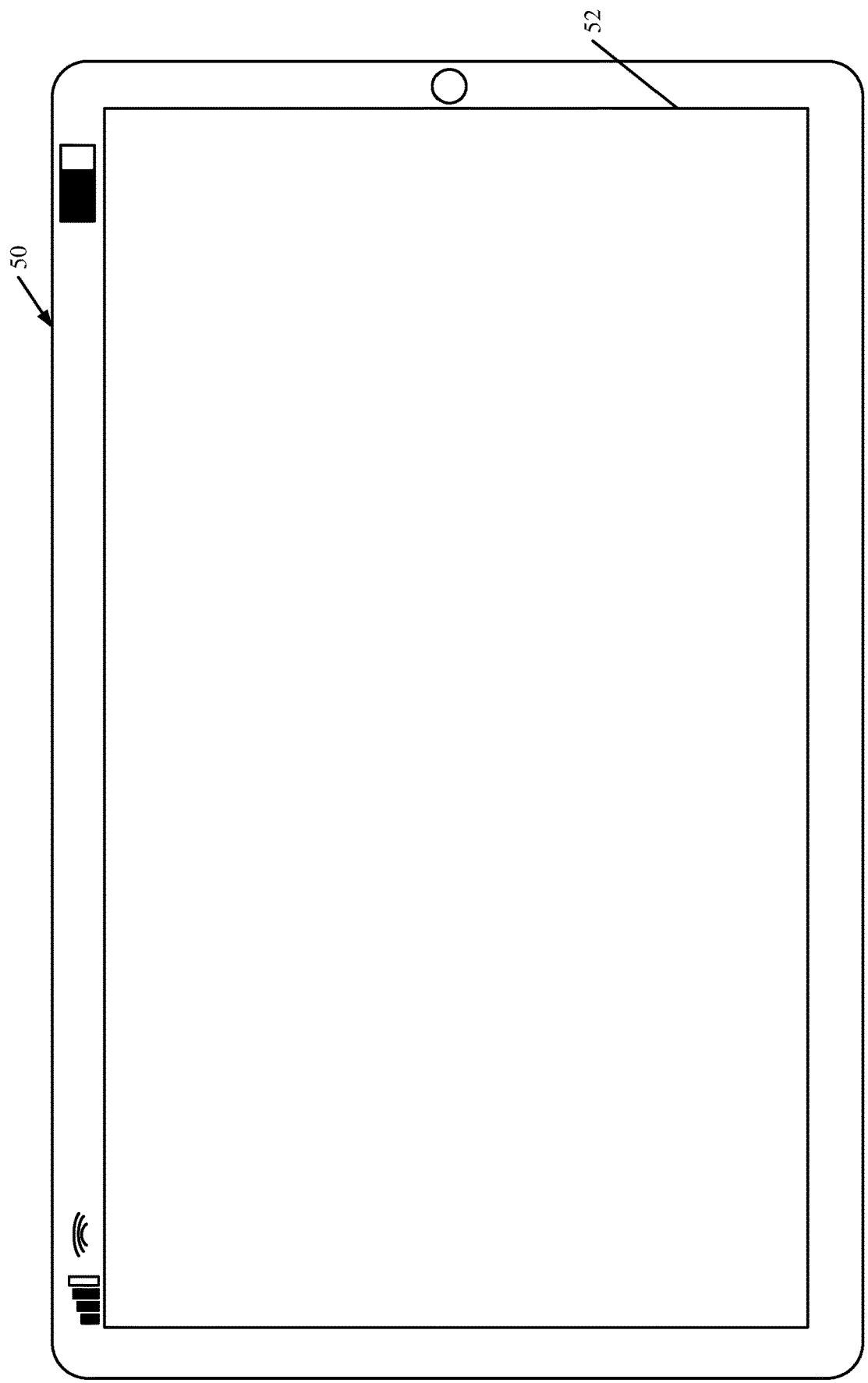
Figure 14:
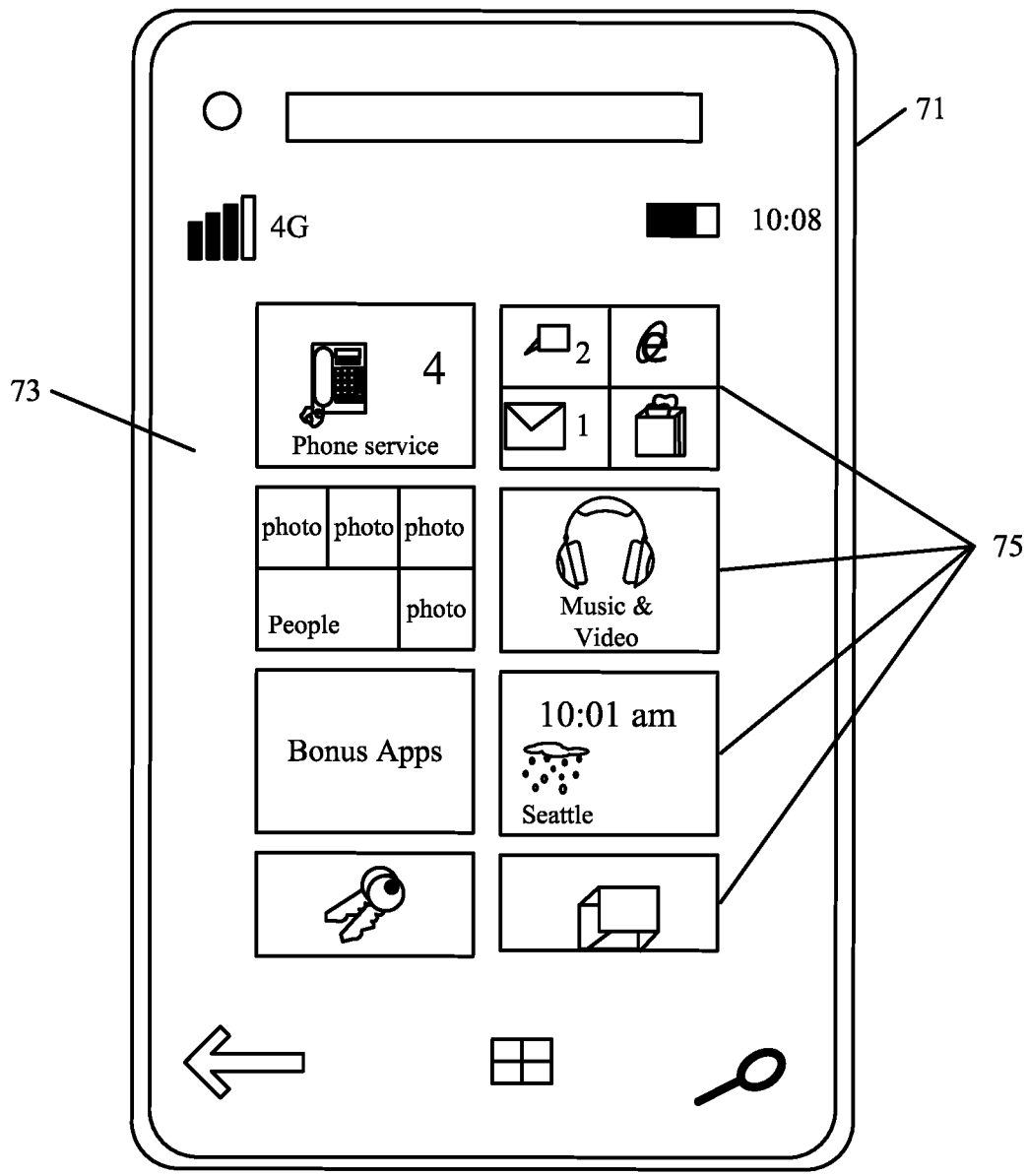

FIG. 12 is a simplified block diagram of one example of a handheld or mobile computing device that can be used as a user's or client's hand held device 16, in which the present system (or parts of it) can be deployed. For instance, a mobile device can be deployed in the operator compartment of agricultural machine 201 (e.g., in the operator compartment of towing vehicle 94) or as remote system 250. FIGS. 13-14 are examples of handheld or mobile devices.

FIG. 12 provides a general block diagram of the components of a client device 16 that can run some components shown in FIG. 7, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 50. In FIG. 13, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
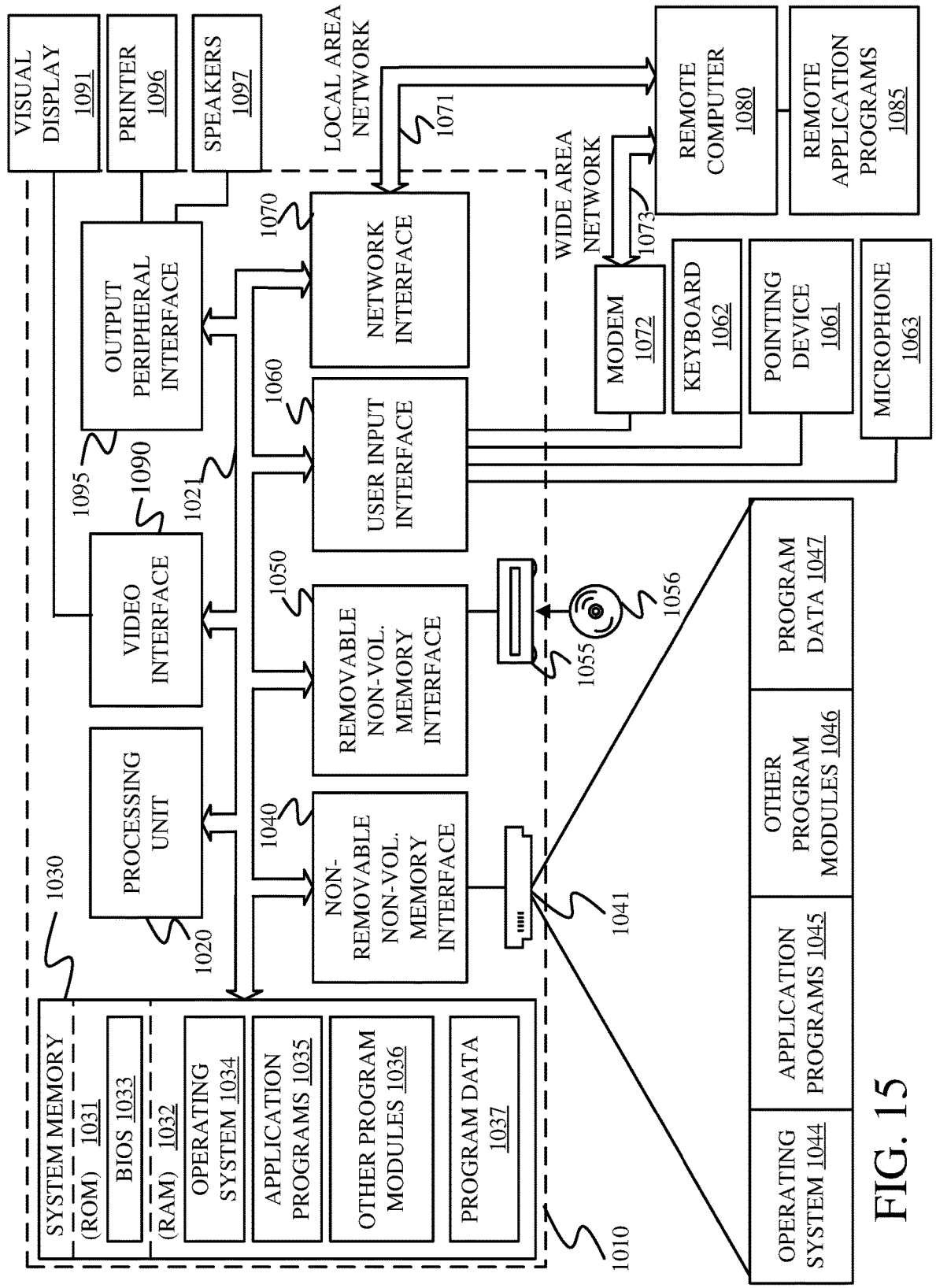
FIG. 15 is a block diagram showing one example of a computing environment that can be used in the architectures shown in the previous figures.

FIG. 15 is one example of a computing environment in which elements of FIG. 7, or parts of it, (for example) can be deployed. With reference to FIG. 15, an example system for implementing some embodiments includes a computing device in the form of a computer 1010 programmed to operate as described above. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 7 can be deployed in corresponding portions of FIG. 15.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 15 illustrates operating system 1034, application programs 1035, other program modules 1036, and program data 1037.

The computer 1010 may also include other removable/non-removable volatile/nonvolatile computer storage media. By way of example only, FIG. 15 illustrates a hard disk drive 1041 that reads from or writes to non-removable, nonvolatile magnetic media, an optical disk drive 1055, and nonvolatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 1010. In FIG. 15, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN, or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 20 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling a planter having a seed ejection endpoint, the computer implemented method comprising:
   identifying, during operation of the planter that moves through a path in a field in a direction of travel, a material location indicative of a location of a non-seed material, previously applied to the field, that resides in the path ahead of the seed ejection endpoint;
   identifying a target seed location for a seed based on a target spacing between the seed and the non-seed material previously applied to the field; and
   controlling the planter to eject the seed from the seed ejection endpoint to the field based on the target seed location.

2. The computer implemented method of claim 1, wherein controlling the planter comprises:
   controlling the planter to eject the seed from the seed ejection endpoint at the target seed location in a furrow opened by the planter.

3. The computer implemented method of claim 2 and further comprising:
   applying the non-seed material to the field with a material application system coupled to the planter.

4. The computer implemented method of claim 3 wherein identifying the location of the non-seed material comprises:
   identifying, during operation of the planter, the location of the non-seed material relative to the seed ejection endpoint.

5. The computer implemented method of claim 4 wherein controlling the planter to eject the seed comprises:
   controlling the planter to eject the seed based on the location of the non-seed material relative to the seed ejection endpoint.

6. The computer implemented method of claim 3 wherein the location of the non-seed material comprises a geographic location of the non-seed material.

7. The computer implemented method of claim 6 wherein controlling the planter to eject the seed comprises:
   identifying a geographic location of the planter; and
   controlling the planter to eject the seed based on the geographic location of the non-seed material and the geographic location of the planter.

8. The computer implemented method of claim 3 wherein identifying a material location comprises:

identifying a timing of material placement by the material application system to a location in the field.

9. The computer implemented method of claim 8 wherein controlling the planter comprises:
controlling the planter, based on the timing of material placement, to eject the seed from the seed ejection endpoint at a time so the seed is ejected at a location in a predefined spatial relation to the location of the non-seed material in the field.

10. The computer implemented method of claim 2 wherein identifying, during the operation of the planter, the material location comprises:
receiving a material map that maps locations in the field where the non-seed material was applied; and
identifying a geographic location of the non-seed material based on the material map,
wherein controlling the planter to eject the seed comprises:
controlling the planter to eject the seed from the seed ejection endpoint at a seed location in the furrow based on the geographic location of the non-seed material.

11. The computer implemented method of claim 10 wherein the non-seed material comprises at least one of:
a fertilizer,
a herbicide,
an insecticide, or
a pesticide.

12. The computer implemented method of claim 1 wherein the target spatial relation comprises a predefined spatial relation, and controlling the planter comprises:
controlling the planter, based on the location of the non-seed material, to eject the seed from the seed ejection endpoint at a point that conforms to the predefined spatial relation to the location of the non-seed material.

13. An agricultural system, comprising:
an agricultural machine including a seeding system having a seed ejection endpoint configured to eject a seed to a field;
a target determination component configured to:
identify a field location of a non-seed material, previously applied to the field, that resides in a path of the seed ejection endpoint; and
determine a target location for the seed that conforms to a predefined spacing between the seed and the non-seed material; and
a seed ejection system configured to generate a control signal to control the seeding system to eject the seed from the seed ejection endpoint based on the target location.

14. The agricultural system of claim 13 and comprising:
a seed tracking system configured to track a position of the seed in the seeding system and generate a seed position signal indicative of the position of the seed in the seeding system, the seed ejection system being configured to generate the control signal based on the seed tracking signal.

15. The agricultural system of claim 14 wherein the agricultural machine is configured to move through the field in a direction of travel and wherein the target determination component is configured to control the seeding system to eject the seed from the seed ejection endpoint at a seed location in a furrow opened by the agricultural machine based on the predefined spatial relation.

16. The agricultural system of claim 15 wherein the agricultural machine comprises:
a material application control system; and
a material application system controlled by the material application control system to apply the non-seed material to locations in the field ahead of the seed ejection endpoint in the direction of travel.

17. The agricultural system of claim 16 wherein the target determination component is configured to identify, during operation of the seeding system, a location of the non-seed material relative to the seed ejection endpoint, the seed ejection system being configured to control the seeding system to eject the seed based on the location of the non-seed material relative to the seed ejection endpoint.

18. A computer system for controlling a seeding system of a planter that is configured to move through a field in a direction of travel, the computer system comprising:
at least one processor; and
memory storing computer executable instructions which, when executed by the at least one processor, cause the computing system to:
identify a material location characteristic indicative of a location of a material, previously applied to a field, that resides in a path of the planter;
track a position of a seed in the seeding system, to generate a tracked position of the seed, prior to release of the seed from the seeding system; and
control the seeding system of the planter to eject the seed from a seed ejection endpoint at a seed location in a furrow opened by the planter based on the material location characteristic and the tracked position of the seed in the seeding system.

19. The computer system of claim 18 and further comprising:
a material application system; and
a material application control system configured to control the material application system to apply the material to the field ahead of the seed ejection endpoint in the direction of travel.

* * * * *